(12) United States Patent
Sherstyuk et al.

(10) Patent No.: US 10,218,200 B2
(45) Date of Patent: *Feb. 26, 2019

(54) SYSTEMS AND METHODS FOR ENHANCING THE PERFORMANCE AND UTILIZATION OF BATTERY SYSTEMS

(71) Applicant: GBATTERIES ENERGY CANADA INC., Ottawa (CA)

(72) Inventors: Mykola Sherstyuk, Ottawa (CA); Tymofiy Sherstyuk, Ottawa (CA); Mikhail Prokoptsov, Kanata (CA)

(73) Assignee: GBatteries Energy Canada Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/913,838

(22) Filed: Mar. 6, 2018

(65) Prior Publication Data

US 2018/0226826 A1 Aug. 9, 2018

Related U.S. Application Data

(63) Continuation of application No. 14/596,400, filed on Jan. 14, 2015, which is a continuation-in-part of
(Continued)

(51) Int. Cl.
*H02J 7/00* (2006.01)
*H01M 10/44* (2006.01)
(Continued)

(52) U.S. Cl.
CPC ........... *H02J 7/0068* (2013.01); *H01M 10/42* (2013.01); *H01M 10/425* (2013.01);
(Continued)

(58) Field of Classification Search
CPC ..................................................... H02J 7/0093
(Continued)

(56) References Cited

U.S. PATENT DOCUMENTS

| 2,317,590 A | 4/1943 | Compere |
| 3,987,353 A | 10/1976 | Macharg |

(Continued)

FOREIGN PATENT DOCUMENTS

| CN | 201532995 U | 7/2010 |
| CN | 201804941 U | 4/2011 |

(Continued)

OTHER PUBLICATIONS

Alzieu, J. et al., "Improvement of intelligent battery controller: state-of-charge indicator and associated functions," J. Power Source, vol. 67, No. 1-2, pp. 157-161 (1997).
(Continued)

*Primary Examiner* — Yalkew Fantu
(74) *Attorney, Agent, or Firm* — Schott, P.C.

(57) ABSTRACT

Various systems and methods for enhancing the performance and utilization of a battery system are described. In one method, a configuration schedule for a battery system is determined based on communications received from an external unit and the cells of the battery system are reconfigured according to the determined configuration schedule. In another method, a sequence of one or more pulses is used for energy transfer from or to at least one cell of the battery system, wherein at least one parameter of one of the sequence and the one or more pulses, is varied in a random manner. The above-noted pulse sequence may be utilized while the battery system is not supplying power to an external load.

20 Claims, 17 Drawing Sheets

Related U.S. Application Data application No. 14/386,889, filed as application No. PCT/CA2013/000277 on Mar. 25, 2013, now Pat. No. 9,966,780.

(60) Provisional application No. 62/061,881, filed on Oct. 9, 2014, provisional application No. 62/025,299, filed on Jul. 16, 2014, provisional application No. 61/977,096, filed on Apr. 9, 2014, provisional application No. 61/926,961, filed on Jan. 14, 2014, provisional application No. 61/683,691, filed on Aug. 15, 2012, provisional application No. 61/662,882, filed on Jun. 21, 2012, provisional application No. 61/615,282, filed on Mar. 25, 2012.

(51) Int. Cl.
*H01M 10/42* (2006.01)
*H01M 10/48* (2006.01)

(52) U.S. Cl.
CPC ......... *H01M 10/441* (2013.01); *H02J 7/0093* (2013.01); *H01M 10/4264* (2013.01); *H01M 10/482* (2013.01); *H02J 2007/0067* (2013.01); *H02J 2007/0098* (2013.01)

(58) Field of Classification Search
USPC .......................................................... 320/129
See application file for complete search history.

(56) References Cited

U.S. PATENT DOCUMENTS

| | | |
|---|---|---|
| 4,016,473 A | 4/1977 | Newman |
| 4,680,241 A | 7/1987 | Dyer |
| 4,878,007 A | 10/1989 | Gabor et al. |
| 5,183,404 A | 2/1993 | Aldous et al. |
| 5,190,466 A | 3/1993 | McVey |
| 5,357,177 A * | 10/1994 | Fey ........................ B62M 25/08 318/3 |
| 5,411,405 A | 5/1995 | McDaniels et al. |
| 5,436,548 A | 7/1995 | Thomas |
| 5,500,583 A | 3/1996 | Buckley et al. |
| 5,504,415 A | 4/1996 | Podrazhansky et al. |
| 5,525,892 A | 6/1996 | Phommarath |
| 5,547,401 A | 8/1996 | Aldous et al. |
| 5,648,714 A | 7/1997 | Eryou et al. |
| 5,677,612 A | 10/1997 | Campagnuolo et al. |
| 5,701,068 A | 12/1997 | Baer et al. |
| 5,747,189 A | 5/1998 | Perkins |
| 5,828,201 A | 10/1998 | Hoffman, Jr. et al. |
| 5,931,704 A | 8/1999 | Johnson et al. |
| 5,955,869 A | 9/1999 | Rathmann |
| 5,989,042 A | 11/1999 | Johnson et al. |
| 6,002,240 A * | 12/1999 | McMahan ......... H01M 10/4257 320/150 |
| 6,033,240 A | 3/2000 | Goff |
| 6,078,166 A | 6/2000 | Taricco |
| 6,132,327 A * | 10/2000 | Campagnolo .......... B62M 25/08 474/103 |
| 6,146,210 A | 11/2000 | Cha et al. |
| 6,184,660 B1 * | 2/2001 | Hatular .................. H02J 7/022 320/139 |
| 6,232,750 B1 | 5/2001 | Podrazhansky et al. |
| 6,361,357 B1 | 3/2002 | Stillwell et al. |
| 6,364,697 B1 | 4/2002 | Tseng et al. |
| 6,366,056 B1 | 4/2002 | Podrazhansky et al. |
| 6,452,363 B1 | 9/2002 | Jabaji |
| 6,482,019 B1 | 11/2002 | Lo Forte et al. |
| 6,509,876 B1 | 1/2003 | Jones et al. |
| 6,561,824 B1 | 5/2003 | Beckham et al. |
| 6,707,272 B1 | 3/2004 | Thandiwe |
| 6,729,897 B2 | 5/2004 | Lai |
| 6,799,981 B1 | 10/2004 | Yu |
| 6,917,283 B2 * | 7/2005 | Takeda ..................... B62J 99/00 340/432 |
| 7,189,089 B1 | 3/2007 | Liao |
| 7,364,473 B2 | 4/2008 | Ohta |
| 7,500,867 B1 | 3/2009 | Doglio |
| 7,570,015 B2 | 8/2009 | Bansal et al. |
| 7,630,810 B2 * | 12/2009 | Guderzo ................ B62M 9/122 474/116 |
| 7,794,263 B1 | 9/2010 | Kim et al. |
| 7,918,686 B1 | 4/2011 | Lin |
| 8,137,116 B2 | 3/2012 | Omori et al. |
| 8,138,724 B2 | 3/2012 | Li et al. |
| 8,142,221 B2 | 3/2012 | Malstron et al. |
| 8,330,419 B2 | 12/2012 | Kim et al. |
| 8,368,357 B2 | 2/2013 | Ghantous et al. |
| 8,427,106 B2 | 4/2013 | Kim et al. |
| 8,462,944 B2 | 6/2013 | Vanstone et al. |
| 8,513,921 B2 | 8/2013 | Berkowitz et al. |
| 8,698,022 B2 | 4/2014 | Kawakami |
| D718,241 S | 11/2014 | Gretz |
| 8,994,331 B2 | 3/2015 | Kerfoot, Jr. et al. |
| 9,054,440 B2 | 6/2015 | Taylor et al. |
| D734,271 S | 7/2015 | Tosto et al. |
| D821,980 S | 7/2018 | Cousineau et al. |
| 10,020,608 B2 | 7/2018 | Cousineau et al. |
| 2002/0028604 A1 | 3/2002 | Lo et al. |
| 2003/0224637 A1 | 12/2003 | Ling |
| 2004/0005947 A1 * | 1/2004 | Shahana ................ B62M 25/02 474/78 |
| 2004/0038087 A1 | 2/2004 | Shiue et al. |
| 2004/0146764 A1 | 7/2004 | Tsai et al. |
| 2004/0224539 A1 | 11/2004 | Boyd et al. |
| 2006/0092583 A1 | 5/2006 | Alahmad et al. |
| 2007/0273643 A1 | 11/2007 | Erez et al. |
| 2008/0079397 A1 | 4/2008 | Fee et al. |
| 2010/0164430 A1 | 7/2010 | Lu et al. |
| 2011/0076525 A1 | 3/2011 | Zhang et al. |
| 2011/0198103 A1 * | 8/2011 | Suzuki ..................... B25F 5/00 173/46 |
| 2012/0025756 A1 | 2/2012 | Xu et al. |
| 2013/0234667 A1 | 9/2013 | Norton |
| 2016/0014966 A1 | 1/2016 | Kraus et al. |
| 2017/0005497 A1 | 1/2017 | Sherstyuk et al. |

FOREIGN PATENT DOCUMENTS

| | | |
|---|---|---|
| JP | H06163081 A | 6/1994 |
| SU | 922923 A1 | 4/1982 |
| WO | 2011/132300 A1 | 10/2011 |
| WO | 2013/142964 A1 | 10/2013 |

OTHER PUBLICATIONS

Chiasserini, C.F., and Rao, R.R., "A Model for Battery Pulsed Discharge with Recovery Effect," Wireless Communications and Networking Conference WCNC. 1999 IEEE, vol. 2, pp. 636-639 (1999).

Chiasserini, C. F., and Rao, R.R., "Pulsed Battery Discharge in Communication Devices," MobiCom '99 Proceedings of the 5th annual ACM/IEEE international conference on Mobile computing and networking, pp. 88-95 (1999).

Chiasserini, C. F., and Rao, R.R., "Pulsed battery discharge in communication devices," Proc. of Mobicom'99, Seattle, pp. 88-95 (Aug. 1999).

Fuller, T.F., et al., "Relaxation phenomena in lithium-Ion-insertion cells," J. Electrochem. Soc., vol. 141, No. 4, pp. 982-990 (1994).

Gomadam, P.M., et al., "Analysis of Pulse Discharge of a Lithium-Ion Battery," Center for Electrochemical Engineering, University of South Carolina, accessed at https://www.electrochem.org/dl/ma/200/pdfs/0148.pdf, p. 1 (Aug. 2014).

Lafollette, R. M., "Design and performance of high specific power, pulsed discharge, bipolar lead acid batteries," Proceedings of the Tenth Annual Battery Conference on Applications and Advances, pp. 43-47 (1995).

Lafollette, R. M. et al., "Design fundamentals of high power density, pulsed discharge, lead-acid batteries. II Modeling," in Journal of the Electrochemical Society, vol. 137, No. 12, pp. 3701-3707 (1990).

(56) References Cited

OTHER PUBLICATIONS

Li, J., et al., "The effects of pulse charging on cycling characteristics of commercial lithium-ion batteries," Journal of Power Sources, vol. 102, School of Chemical Engineering, Georgia Institute of Technology, pp. 302-309 (2001).
Nelson, R.F., et al., "Ultrafast pulse discharge and recharge capabilities of thin-metal film battery technology," 12th Annual Battery Conference on Applications and Advances, Long Beach, pp. 636-641 (Jan. 1997).
Nelson, S., "TMF ultra-high rate discharge performance," 12th Annual Battery Conference on Applications and Advances, Long Beach, pp. 139-143 (Jan. 1997).
Rihito, M., and Hara, S., "A Pulsed Discharge Control of Battery," TENCON 2006. 2006 IEEE Region 10 Conference, Graduate School of Engineering, Osaka University, pp. 1-4 (2006).
Extended European Search Report dated Nov. 20, 2015 received in Application No. 15151183.9.
International Search Report and Written Opinion of the International Searching Authority for PCT Application No. PCT/CA2013/000277 dated Jun. 13, 2013.

\* cited by examiner

| $V_b(V)$ | $T_{rest}(s)$ | $T_{reverse}(s)$ | $T_{wait}(s)$ | $T_{forward}(s)$ | $I_{reverse}(A)$ | $I_{forward}(A)$ | $N_{cycles}$ | $T_{break}(s)$ |
|---|---|---|---|---|---|---|---|---|
| 2.5 | 1 | 0.3 | 0.3 | 0.3 | -0.7 | 0.7 | 6 | 12 |
| 2.7 | 1 | 0.3 | 0.3 | 0.3 | -0.7 | 0.7 | 7 | 12 |
| 3.0 | 1 | 0.3 | 0.3 | 0.3 | -0.7 | 0.7 | 7 | 10 |
| 3.1 | 1 | 0.3 | 0.3 | 0.3 | -0.7 | 0.7 | 7 | 10 |
| 3.2 | 1 | 0.3 | 0.3 | 0.35 | -0.7 | 0.7 | 7 | 10 |
| 3.3 | 1 | 0.3 | 0.3 | 0.5 | -0.7 | 0.7 | 7 | 10 |
| 3.4 | 1 | 0.3 | 0.3 | 0.55 | -0.7 | 0.7 | 7 | 10 |
| 3.52 | 1 | 0.3 | 0.3 | 0.7 | -0.7 | 0.7 | 7 | 10 |
| 3.55 | 1 | 0.3 | 0.3 | 0.8 | -0.7 | 0.7 | 7 | 10 |
| 3.6 | 1 | 0.3 | 0.3 | 1.5 | -0.7 | 0.7 | 7 | 10 |
| 3.65 | 1 | 0.3 | 0.3 | 2.5 | -0.7 | 0.7 | 7 | 10 |
| 3.7 | 1 | 0.3 | 0.3 | 2.5 | -0.7 | 0.7 | 7 | 10 |
| 3.8 | 1 | 0.3 | 0.3 | 2.5 | -0.7 | 0.7 | 7 | 10 |
| 3.9 | 1 | 0.3 | 0.3 | 2.5 | -0.7 | 0.7 | 7 | 10 |
| 4.0 | 1 | 0.3 | 0.3 | 2.5 | -0.7 | 0.7 | 7 | 15 |
| 4.1 | 1 | 0.3 | 0.3 | 2.5 | -0.7 | 0.7 | 7 | 15 |
| 4.15 | 1 | 0.3 | 0.3 | 2.5 | -0.7 | 0.7 | 9 | 15 |
| 4.16 | 1 | 0.3 | 0.3 | 2.5 | -0.7 | 0.7 | 8 | 15 |
| 4.17 | 1 | 0.3 | 0.3 | 2.5 | -0.7 | 0.7 | 7 | 15 |
| 4.2 | 1 | 0.3 | 0.3 | 2.5 | -0.5 | 0.7 | 10 | 15 |
| 4.4 | 1 | 0.3 | 0.3 | 3.5 | -0.4 | 0.5 | 10 | 15 |
| 4.6 | 1 | 0.3 | 0.3 | 3.5 | -0.4 | 0.5 | 10 | 15 |
| 4.8 | 1 | 0.3 | 0.3 | 3.5 | -0.4 | 0.5 | 10 | 15 |

FIG. 4B

| $V_b$(V) | $T_{rest}$(s) | $T_{reverse}$(s) | $T_{wait}$(s) | $T_{forward}$(s) | $I_{reverse}$(A) | $I_{forward}$(A) | $N_{cycles}$ | $T_{break}$(s) |
|---|---|---|---|---|---|---|---|---|
| 2.5 | 0.05 | 0.005 | 0.005 | 0.06 | 0.5 | -0.5 | 20 | 0 |
| 2.7 | 0.05 | 0.005 | 0.005 | 0.06 | 0.5 | -0.5 | 20 | 0 |
| 3.0 | 0.05 | 0.005 | 0.005 | 0.06 | 0.5 | -0.5 | 20 | 0 |
| 3.1 | 0.05 | 0.005 | 0.005 | 0.06 | 0.5 | -0.5 | 20 | 0 |
| 3.2 | 0.05 | 0.005 | 0.005 | 0.06 | 0.5 | -0.5 | 20 | 0 |
| 3.3 | 0.05 | 0.005 | 0.005 | 0.06 | 0.5 | -0.5 | 20 | 0 |
| 3.4 | 0.05 | 0.005 | 0.005 | 0.06 | 0.5 | -0.5 | 20 | 0 |
| 3.52 | 0.05 | 0.005 | 0.005 | 0.06 | 0.5 | -0.5 | 20 | 0 |
| 3.55 | 0.05 | 0.005 | 0.005 | 0.06 | 0.5 | -0.5 | 20 | 0 |
| 3.6 | 1 | 0.1 | 0.1 | 1.2 | 0.5 | -0.5 | 20 | 0 |
| 3.65 | 1 | 0.1 | 0.1 | 1.2 | 0.5 | -0.5 | 20 | 0 |
| 3.7 | 1 | 0.1 | 0.1 | 1.2 | 0.5 | -0.5 | 20 | 0 |
| 3.8 | 1 | 0.1 | 0.1 | 1.2 | 0.5 | -0.5 | 20 | 0 |
| 3.9 | 1 | 0.1 | 0.1 | 1.2 | 0.5 | -0.5 | 20 | 0 |
| 4.0 | 1 | 0.1 | 0.1 | 1.2 | 0.5 | -0.5 | 20 | 0 |
| 4.1 | 1 | 0.1 | 0.1 | 1.2 | 0.5 | -0.5 | 20 | 0 |
| 4.15 | 1 | 0.1 | 0.1 | 1.2 | 0.5 | -0.5 | 20 | 0 |
| 4.16 | 1 | 0.1 | 0.1 | 1.2 | 0.5 | -0.5 | 20 | 0 |
| 4.17 | 1 | 0.1 | 0.1 | 1.2 | 0.5 | -0.5 | 20 | 0 |
| 4.2 | 1 | 0.1 | 0.1 | 1.2 | 0.5 | -0.5 | 20 | 0 |
| 4.4 | 1 | 0.1 | 0.1 | 1.2 | 0.5 | -0.5 | 20 | 0 |
| 4.6 | 1 | 0.1 | 0.1 | 1.2 | 0.5 | -0.5 | 20 | 0 |
| 4.8 | 1 | 0.1 | 0.1 | 1.2 | 0.5 | -0.5 | 20 | 0 |

FIG. 4C

| # of Weeks | B3 Capacity (Whr) | Decrease (%) | B4 Capacity (Whr) | Decrease (%) |
|---|---|---|---|---|
| 1 | 2.96 | 0.00 | 3.11 | 0.00 |
| 2 | 2.98 | 0.68 | 3.14 | -0.96 |
| 3 | 3.01 | 1.69 | 3.10 | 0.32 |
| 4 | 2.87 | 3.04 | 3.17 | -1.93 |
| 5 | 2.92 | 1.35 | 3.11 | 0.00 |
| 6 | 2.83 | 4.39 | 3.19 | -2.57 |
| 7 | 2.91 | 1.69 | 3.13 | -0.64 |
| 8 | 2.95 | 0.34 | 3.02 | 2.89 |
| 9 | 2.81 | 5.07 | 3.08 | 0.96 |
| 10 | 2.74 | 7.43 | 3.11 | 0.00 |
| 11 | 2.62 | 11.49 | 3.06 | 1.61 |
| 12 | 2.78 | 6.08 | 3.00 | 3.54 |
| 13 | 2.44 | 17.57 | 3.05 | 1.93 |
| 14 | 2.48 | 16.22 | 3.11 | 0.00 |
| 15 | 2.32 | 21.62 | 3.10 | 0.32 |
| 16 | 2.37 | 19.93 | 3.09 | 0.64 |
| 17 | 2.31 | 21.96 | 3.11 | 0.00 |
| 18 | 2.11 | 28.72 | 3.05 | 1.93 |
| 19 | 1.97 | 33.45 | 3.09 | 0.64 |
| 20 | 1.90 | 35.81 | 3.07 | 1.29 |
| 21 | 1.74 | 41.22 | 3.05 | 1.93 |

FIG. 10A

| # of Cycles | B3 Capacity (Whr) | Decrease (%) | B4 Capacity (Whr) | Decrease (%) |
|---|---|---|---|---|
| 0 | 2.96 | 0.00 | 3.10 | 0.00 |
| 20 | 2.91 | 1.69 | 3.00 | 3.23 |
| 40 | 2.77 | 6.42 | 2.98 | 3.87 |
| 60 | 2.70 | 8.78 | 3.02 | 2.58 |
| 80 | 2.64 | 10.81 | 2.94 | 5.16 |
| 100 | 2.60 | 12.16 | 3.02 | 2.58 |
| 120 | 2.60 | 12.16 | 3.00 | 3.23 |
| 140 | 2.56 | 13.51 | 3.04 | 1.94 |
| 160 | 2.44 | 17.57 | 2.98 | 3.87 |
| 180 | 2.32 | 21.62 | 2.88 | 7.10 |
| 200 | 2.26 | 23.65 | 2.92 | 5.81 |
| 220 | 2.23 | 24.66 | 2.91 | 6.13 |
| 240 | 2.13 | 28.04 | 2.89 | 6.77 |
| 260 | 2.15 | 27.36 | 2.90 | 6.45 |
| 280 | 2.04 | 31.08 | 2.83 | 8.71 |
| 300 | 1.92 | 35.14 | 2.85 | 8.06 |

SYSTEMS AND METHODS FOR ENHANCING THE PERFORMANCE AND UTILIZATION OF BATTERY SYSTEMS

CROSS-REFERENCE TO RELATED APPLICATIONS

This application is a Continuation Application under 35 U.S.C. § 120 of U.S. patent application Ser. No. 14/596,400, filed on Jan. 14, 2015 and entitled "SYSTEMS AND METHODS FOR ENHANCING THE PERFORMANCE AND UTILIZATION OF BATTERY SYSTEMS," which is a Continuation-in-part Application under 35 U.S.C. § 120 of U.S. patent application Ser. No. 14/386,889, now U.S. Pat. No. 9,966,780, filed on Sep. 22, 2014 and entitled "EXTENDED LIFE BATTERY," which is a U.S. National Stage filing under 35 U.S.C. § 371 of International Application No. PCT/CA2013/000277, filed on Mar. 25, 2013 and entitled "EXTENDED LIFE BATTERY," claiming priority to U.S. Provisional Patent Application No. 61/615,282, filed on Mar. 25, 2012 and entitled "CONTROLLED MULTI-CORE BATTERY SYSTEM," to U.S. Provisional Patent Application No. 61/662,882, filed on Jun. 21, 2012 and entitled "MULTICORE RECHARGEABLE BATTERY WITH EXTENDED CALENDAR LIFE," and to U.S. Provisional Patent Application No. 61/683,691, filed on Aug. 15, 2012 and entitled "MULTI-CORE RECHARGEABLE BATTERY WITH EXTENDED CALENDAR LIFE," all of which are incorporated herein by reference in their entirety. The U.S. patent application Ser. No. 14/596,400 also claims priority to U.S. Provisional Patent Application No. 61/926,961, filed on Jan. 14, 2014 and entitled "METHOD OF BATTERY CONTROL UTILIZING A PULSE PROTOCOL," to U.S. Provisional Patent Application No. 61/977,096, filed on Apr. 9, 2014 and entitled "METHOD OF BATTERY CONTROL FOR NEW ANODE AND ENERGY STORAGE SYSTEM," to U.S. Provisional Patent Application No. 62/025,299, filed on Jul. 16, 2014 and entitled "METHOD, DEVICE AND SYSTEMS FOR CHARGING OF PORTABLE ELECTRONIC DEVICES," and to U.S. Provisional Patent Application No. 62/061,881, filed on Oct. 9, 2014 and entitled "BATTERY SYSTEMS UTILIZING HELPER CELLS," the contents of all of which are incorporated herein by reference in their entirety.

FIELD OF THE DISCLOSURE

The present disclosure relates generally to battery systems and methods for operating the same. More particularly, the present disclosure relates to systems and methods for enhancing the performance and utilization of a battery system.

BACKGROUND OF THE DISCLOSURE

Advances in battery technology have not kept up with market demand. There is a need to improve the performance of battery systems, both in terms of charge storage capacity as well as in terms of extending its operational lifetime (in number of years and/or charge/discharge cycles). In addition, there is also a need to improve the utilization of a battery system during normal discharging operations.

This background information is provided for the purpose of making known information believed by the applicant to be of possible relevance to the invention. No admission is necessarily intended, nor should be construed, that any of the preceding information constitutes prior art against the invention.

BRIEF SUMMARY OF THE DISCLOSURE

The object of the present disclosure is to provide systems and methods for enhancing the performance and utilization of the battery system.

In accordance with an aspect of the present disclosure, there is provided a method for managing a battery system, said method comprising utilizing a sequence of one or more pulses for energy transfer from or to at least one cell of the battery system, wherein at least one parameter of one of the sequence and the one or more pulses, is varied in a random manner. The sequence of one or more pulses may be utilized while the battery system is not supplying power to an external load.

In accordance with an aspect of the present disclosure, there is provided a method of operating a battery system in conjunction with an external unit, the method comprising determining a configuration schedule for the battery system based on communications received from the external unit; and reconfiguring cells of the battery system according to the determined configuration schedule. The external unit may an external load and said communications comprise one or more of voltage and current requirements for the external load.

In accordance with an aspect of the present disclosure, there is provided a method for managing a battery system, said method comprising utilizing a vibration transducer, operating in one of a continuous wave operating mode and a pulsed operating mode, operatively associated with one or more cells of the battery system to provide vibrations thereto, wherein the output of the vibration transducer is based on at least one parameter of the battery system. The battery system may utilize polymeric electrolytes.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2A shows a cluster of pulses. FIG. 2B shows a cluster C1 and a second cluster C2. FIG. 2C shows a super-cluster SC1 comprising multiple clusters C1, C2, . . . , Cn and a second super-cluster SC2.

FIGS. 4B-4C show exemplary pulse parameters used during operation of a battery system for charging and discharging respectively, in accordance with embodiments of the present disclosure.

FIGS. 10A-10B show battery calendar life measurements for battery systems utilizing conventional techniques and methods of the present disclosure.

DETAILED DESCRIPTION

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is provided to describe particular embodiments only and is not intended to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meaning as commonly understood by one of ordinary skill in the art to which this invention belongs.

Figure 1A:
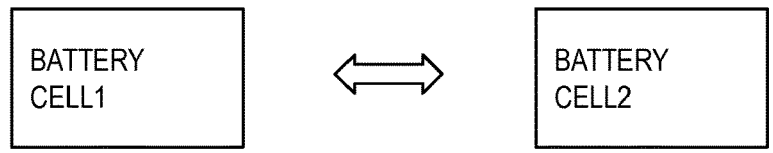
FIGS. 1A-1E show different configurations for energy transfer to and from one or more cells of a battery system, in accordance with embodiments of the present disclosure.

FIG. 1A shows an exemplary battery system including two battery cells C1 and C2 (in embodiments, C1 and C2 could each represent a group of cells). Pulse exchange between C1 and C2 allows retention of all the energy inside of the battery system during energy transfer. At any instant in time, one battery cell serves as an energy source and another battery cells serves as the energy sink. Thus external energy sinks and/or sources are not required for energy transfer to and from these battery cells unlike a conventional battery system where for example, an external charger has to serve as the energy source for energy transfer to a battery cell and an external load (e.g. a resistor or a semiconductor-based load) has to serve as an energy sink for energy transfer from a battery cell.

Figure 1B:
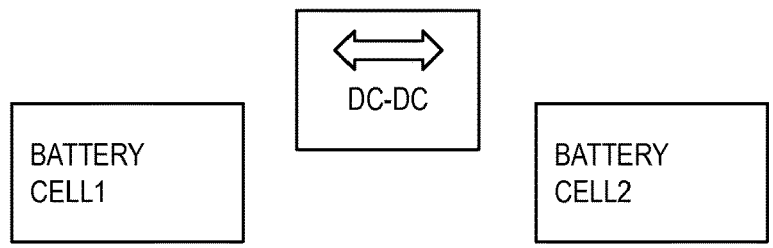
Figure 1C:
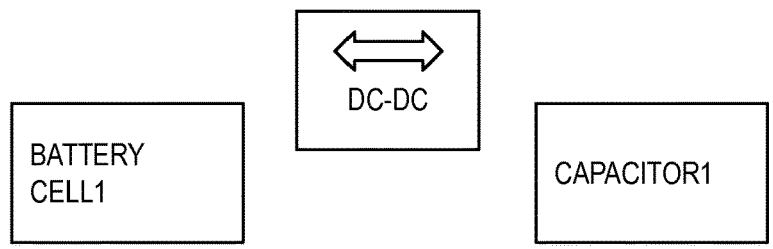
Figure 1D:
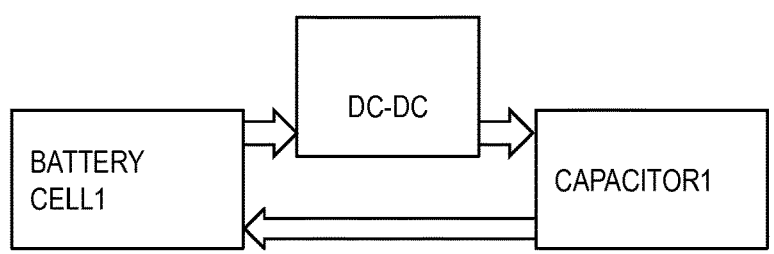
Figure 1E:
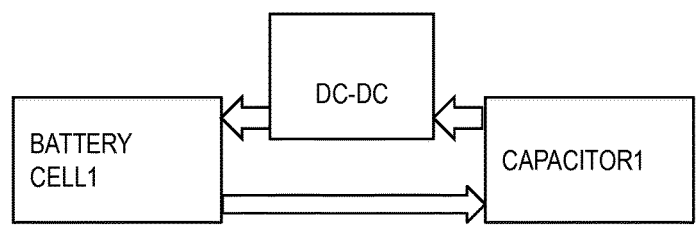

FIG. 1B illustrates an exemplary battery system where the exchange of energy between battery cell C1 and battery cell C2 utilizes a DC-DC converter. In embodiments, a capacitor may be used for energy exchange to and from battery cell C1 instead of the battery cell C2 as shown in FIG. 1C. The capacitor may be external to the battery system. The capacitor thus serves as an intermediary energy storage/energy sink during a discharge pulse for battery cell C1 and as an intermediary energy storage/energy source during a charging pulse for battery cell C1. In embodiments represented by FIGS. 1D-E, the DC-DC converter is only used in the energy transfer in one direction. In embodiments represented by FIG. 1D, the DC-DC converter boosts up the voltage received from battery cell C1 when it is provided to the capacitor. In embodiments represented by FIG. 1E, the DC-DC converter is used to boost the voltage temporarily stored in the capacitor when energy is provided to battery cell C1. In embodiments, a separate DC-DC converter may be used to boost voltage in either direction (i.e., from and to battery cell C1).

Figure 2A:
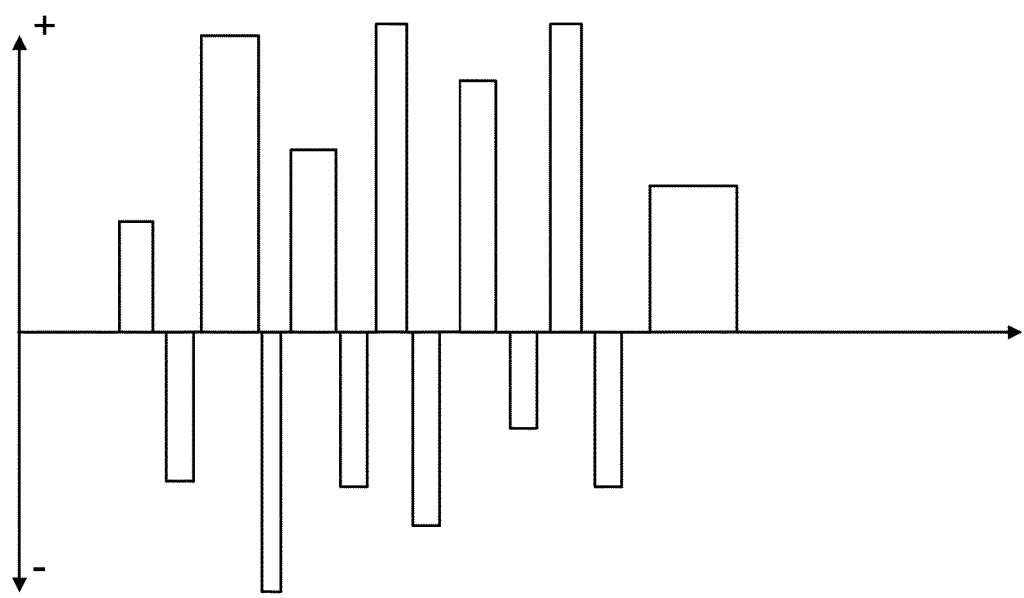
FIGS. 2A-2C represent three exemplary pulse sequences used for energy transfer between two elements (e.g. cells 1 and 2 of FIG. 1A) of the battery system.
Figure 2B:
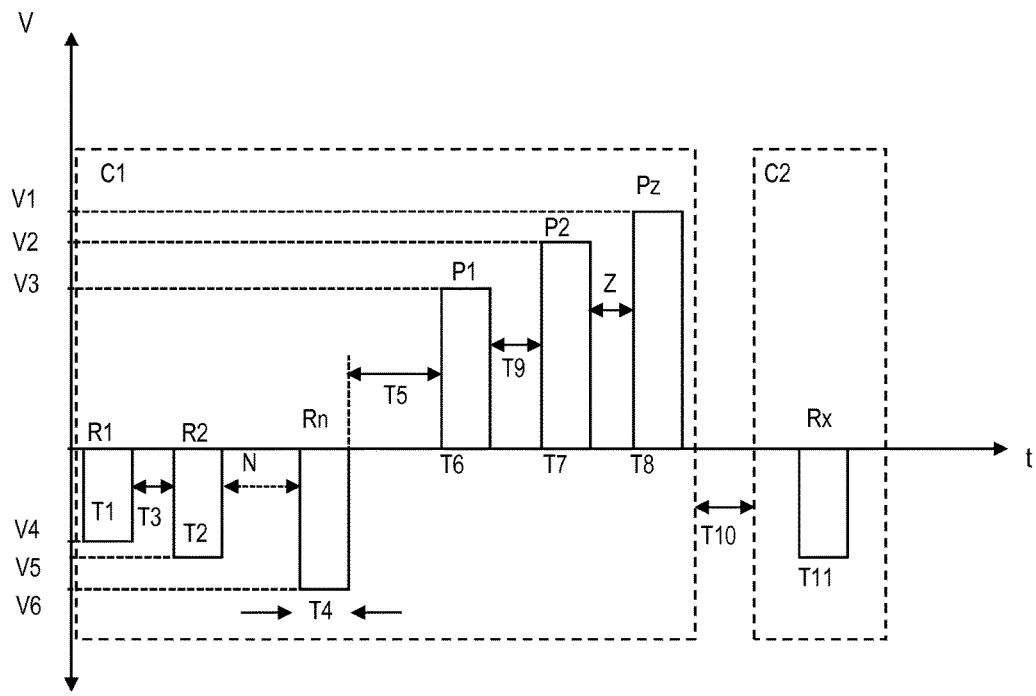
Figure 2C:
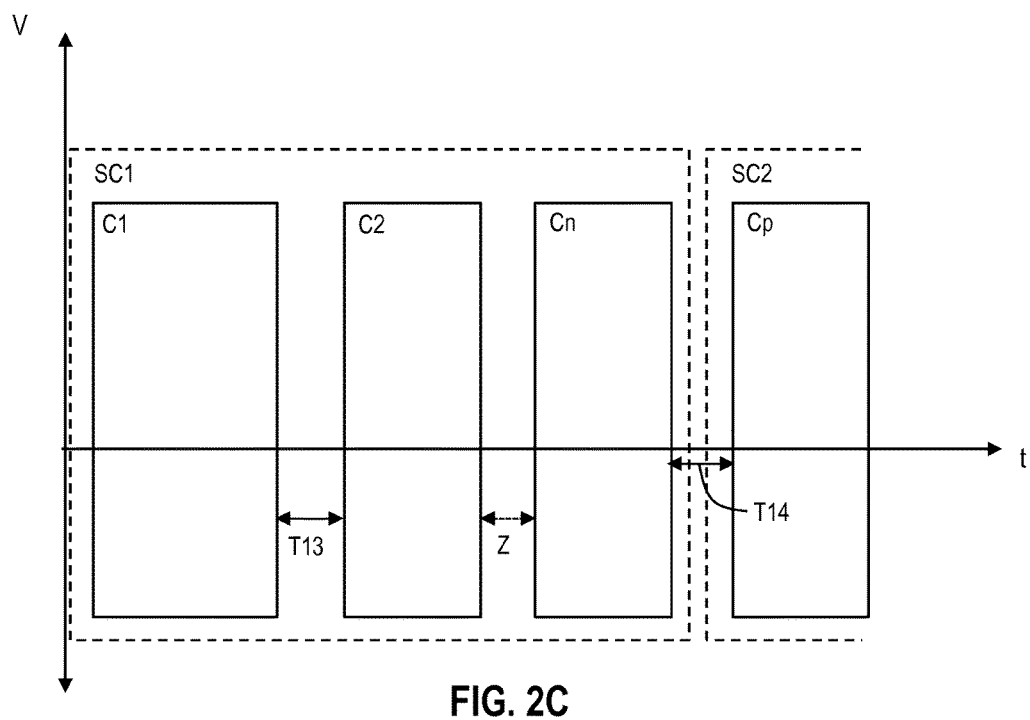
Figure 3A:
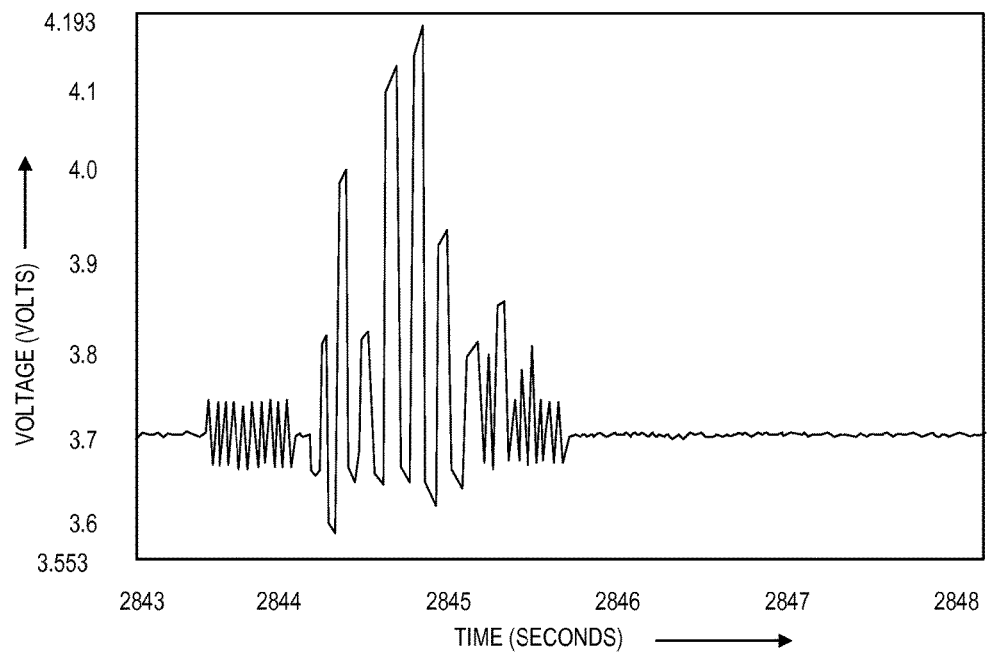
FIGS. 3A-3B show oscilloscope traces of a cluster and a sequence of clusters.
Figure 3B:
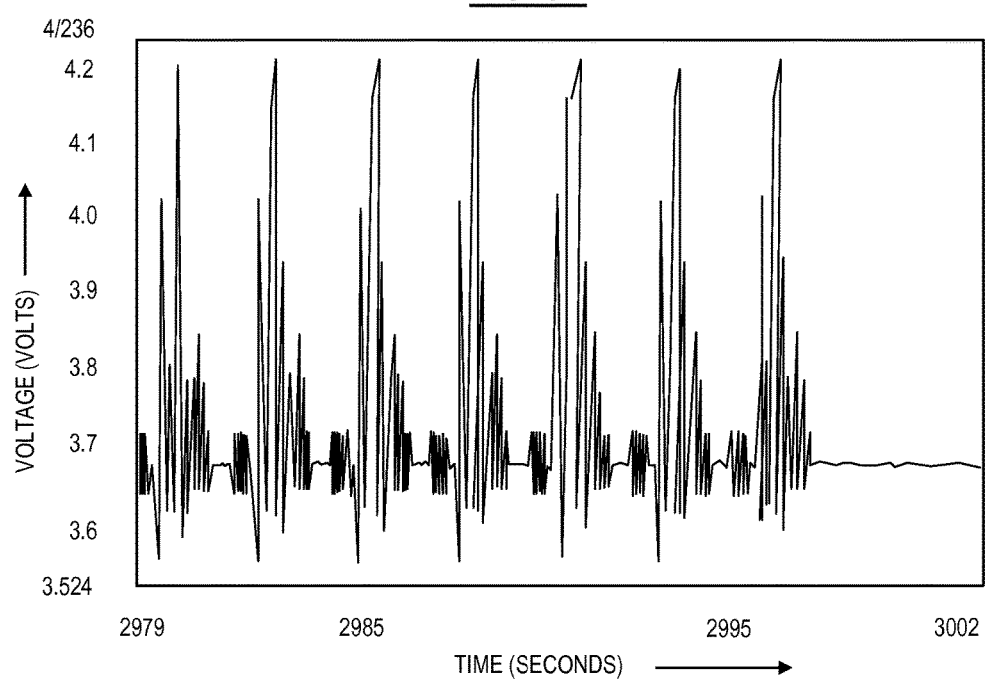

Representations of exemplary pulse sequences used for energy transfer between battery cell C1 and battery cell C2 are shown in FIGS. 2A-C. A group of pulses form a 'cluster' and a group of clusters form a 'super cluster'. For example, positive pulses P1, P2, . . . , Pz and reverse pulses R1, R2, . . . Rn of FIG. 2B can be considered as a cluster C1. The relaxation period after a cluster (T10 in FIG. 2B) may be longer than the relaxation period between pulses within a cluster. FIGS. 3A-B show oscilloscope traces of a cluster and a sequence of clusters, each cluster followed by its own relaxation period.

While the pulse sequences of FIG. 2A-C may be between the two battery cells of FIG. 1A, they may also be between a larger group of cells or a combination of battery cells and other energy storage units (e.g. ultra-capacitors). Positive pulse shows energy flowing into cell C1 (from cell C2 or a charger/capacitor) while a negative pulse shows energy flowing out of cell C1 (into cell C2 or a capacitor/load). Such pulses and pulse sequences create bidirectional movement of ions, as the direction of movement of the charged particles inside the battery cells will change with change of pulse polarity.

The positive and negative pulses can be symmetrical in some instances, but may also be asymmetrical, and differ in duration, start time and/or amplitude. The determination whether to keep the pulse sequences symmetrical or asymmetrical may be based on a variety of factors including but not limited to the state of charge and/or the health of the battery cell.

Amplitude and duration of the pulses may be different relative to each other and may be randomly changed. For example, pulse durations T1, T2, . . . , pause durations T3, . . . , Tn, and/or pulse durations T6, T7, . . . Tz in the cluster C1 of FIG. 2B may be selected randomly from preselected sets of fixed values. For example, a pre-selected set of reverse pulse duration values is 2, 11, 24, 37, 146, 312, 470, 1125, 2700 units (e.g. milliseconds). In addition, the clusters and their relaxation periods may also be randomized. Randomization may be achieved by use of a random number generator module (which may utilize algorithmic random number generators such as disclosed in U.S. Pat. No. 8,462,944 or deterministic random bit generators). The use of randomization may mitigate the use of high-speed algorithms for dynamic control of the pulse sequences based on sensed values. Random selection could be any value chosen from a preselected range of values or any value chosen from a finite set of preselected values. For example, a randomly chosen cluster can be a cluster (C3) chosen from a predetermined set of different clusters {C1, C2, C3, . . . , Cn}. The pre-determined set of pulse parameters may itself be chosen randomly or be based on a real-time algorithm that accounts for sensed parameters of the battery system.

In one instance, a low amplitude and low duration pulse may be followed by a pulse with gradually increased amplitude or duration, but it may in a different instance be followed by a very weak and short pulse or be followed by a significantly higher and longer pulse. In another example, after an idle period following a pulse of positive polarity, a pulse of negative polarity gets initiated at randomly selected instances (rather than in every single instance).

In embodiments, pulse parameters are randomly selected, exemplarily within a predetermined range of values. The range for the values may be limited or determined by physical parameters of the battery and/or by the parameters of the charging system/external load.

An example of a randomly selected pulse parameter may be pulse polarity. This entails that positive or negative pulses may get used randomly, in addition to a random selection of pulse durations and pause durations between them.

In embodiments, the number of pulses within a cluster varies randomly. In embodiments, the number of negative pulses gets selected randomly from a range of values and the number of positive pulses gets selected from a pre-selected set of values. In other embodiments, the number of positive pulses gets randomly selected from a range of values and the number of negative pulses gets selected from a pre-selected set of values.

In embodiments, pause time between clusters is included in the set of randomly selected parameters. In embodiments, all pulse parameters, the number of pulses within a cluster, the duration of a cluster, the duration of the pauses between adjacent clusters are all randomly selected from a range of values.

In embodiments, the pulse shapes for both the positive and negative pulses are selected from a set of available shapes. The pulses may be triangular, rectangular, trapezoidal, or another shape not limited to the above. The selection of the shapes may also be done randomly. Thus, the shape parameter could also be included in the set of randomly selected pulse parameters.

Random selection of the parameters for pulses, clusters and super clusters during charging helps to increase the charging current with minimal harm to the battery system. The techniques of WO 2013/142964, incorporated herein by reference, for charging and energy transfer may be utilized by the charging system 22.

Alternately, the selection for parameters such as mentioned above may be based on results of battery cell characterization rather than randomly, and may be selected dynamically (e.g. in real time). Each set may get used depending on any one of a variety of factors including but not limited to current battery status, age, environment conditions, type of battery, type of charging system and battery mode. Cluster parameters, such as number of pulses, pulse durations, pauses between pulses, pulse amplitude and a cluster's relaxation period may be adjusted depending on the state of charge or the health of the battery system. Pulse clusters may be adjusted depending on the type of battery cell used in the system or even for each battery cell individually.

In embodiments, all parameters of the pulse clusters are dynamically adjusted depending on one or a combination of the following factors within the system or within a component of the system: state of charge or health of the battery cell/system, battery cell chemistry type, battery cell cathode type, battery cell anode type, battery cell separator type, ultra-capacitor type, whether or not system contains energy storage devices other than a battery. Thus, the pulse formations are controlled by a real-time algorithm. Duration of each new pulse or pulse cluster may be adjusted, in embodiments, based on the battery's response to previous pulses or pulse clusters.

In embodiments, pulse parameters need not be changed between pulse, cluster or super cluster. Periodicity of changes may be selected based on battery age, number of cycles, temperature, battery load, charger type, charger condition, available power to supply charger. For example, a cluster may be formed from pulses according to randomly selected values available from a first set (set#1, for ease of reference). The cluster may be repeated twelve times to form a super cluster, with a pause period between each adjacent cluster. The pause period may be selected from the set of parameters. After multiple cycles of charging and discharging, the parameters may be changed. In embodiments, the parameters are changed after one hundred charge/discharge cycles. In other embodiments, the parameters are changed after ten charge/discharge cycles.

Several approaches may be utilized in deciding when to change the parameters for pulses, clusters, and/or super clusters. In embodiments, the parameters are varied for every pulse, pause, cluster or super cluster. In embodiments, the state of the battery is monitored using one or more sensors and changes are made to the pulse sequences when there are noticeable changes in the battery behaviour. In embodiments, the decision when to vary parameters is based on mathematical models for battery behaviour created from test data collected from multiple batteries used in similar modes as the battery currently under control. In embodiments, the timing of a change may be determined dynamically but the parameters for the pulses may still be chosen randomly.

To facilitate dynamic selection of timing or parameters, one or more sensors may be associated with the battery system to measure (exemplarily, in real-time) one or more parameters of the battery system. The battery system includes a battery system controller configured to control various parameters (e.g. shape, amplitude, duration, pauses between adjacent pulses) of the various pulses (pulses for charging/discharging/energy exchange) based on either a predetermined sequence or a sequence determined dynamically. Any of these parameters may be adjusted according to the battery cell state of charge/discharge and its condition (age, temperature, state of health).

Figure 4A:
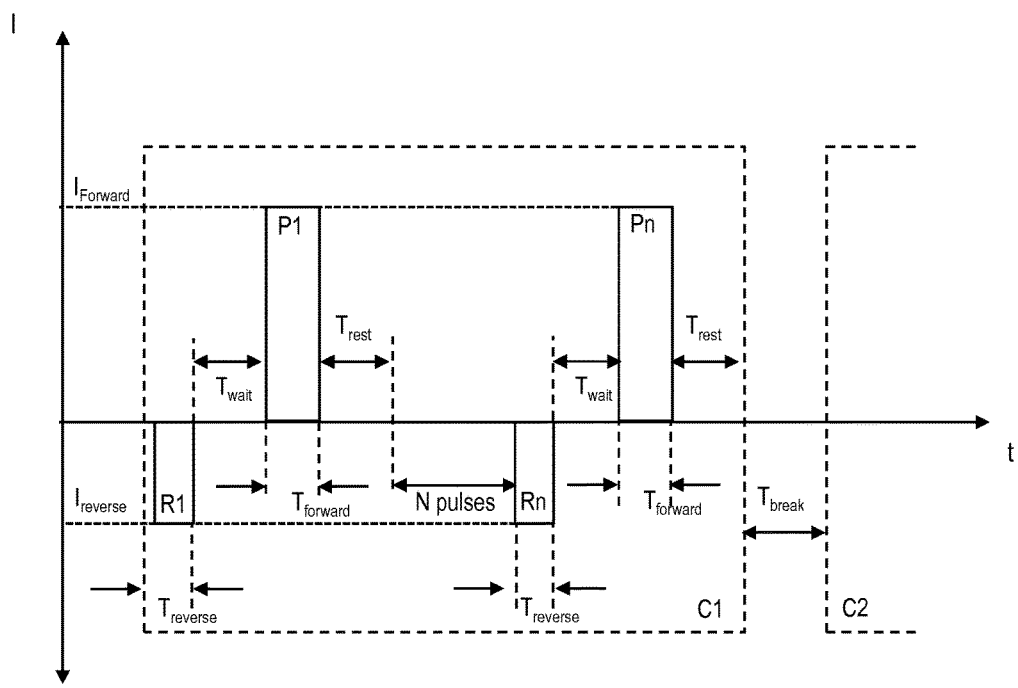
FIG. 4A shows a schematic describing the various parameters noted in FIGS. 4B-4C.

FIGS. 4B-C provides exemplary values of parameters used to form the pulse formations described above. FIG. 4B shows the pulse parameters used to charge a Li-ion cell to 4.8V level, with usage of constant current pulses at different states of a battery cell charge. Similar effect may be attained using pulses from a constant voltage power source that are limited to a maximum current. The pulse duration and pause time would be adjusted based on certain variables. FIG. 4C shows the pulse parameters used to discharge the Li-ion cell. FIG. 4A shows the schematic of a pulse formation, and explains the various parameters shown in FIGS. 4B-C. Vb values of FIGS. 4B-C are battery voltage values measured at the end of each Tbreak before next cluster gets started.

Figure 5A:
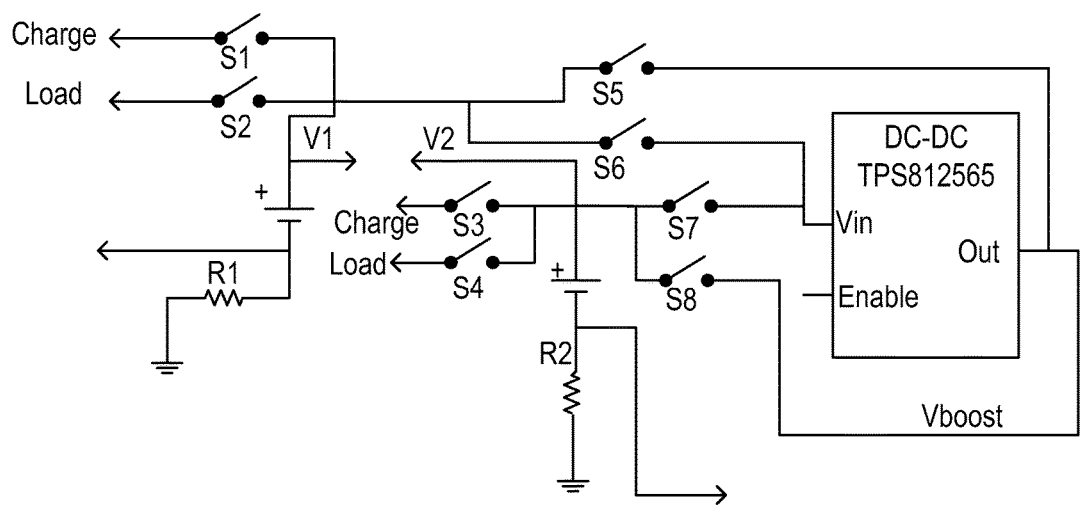
FIG. 5A shows the schematic of a two-cell battery system, in accordance with embodiments of the present disclosure.
Figure 5B:
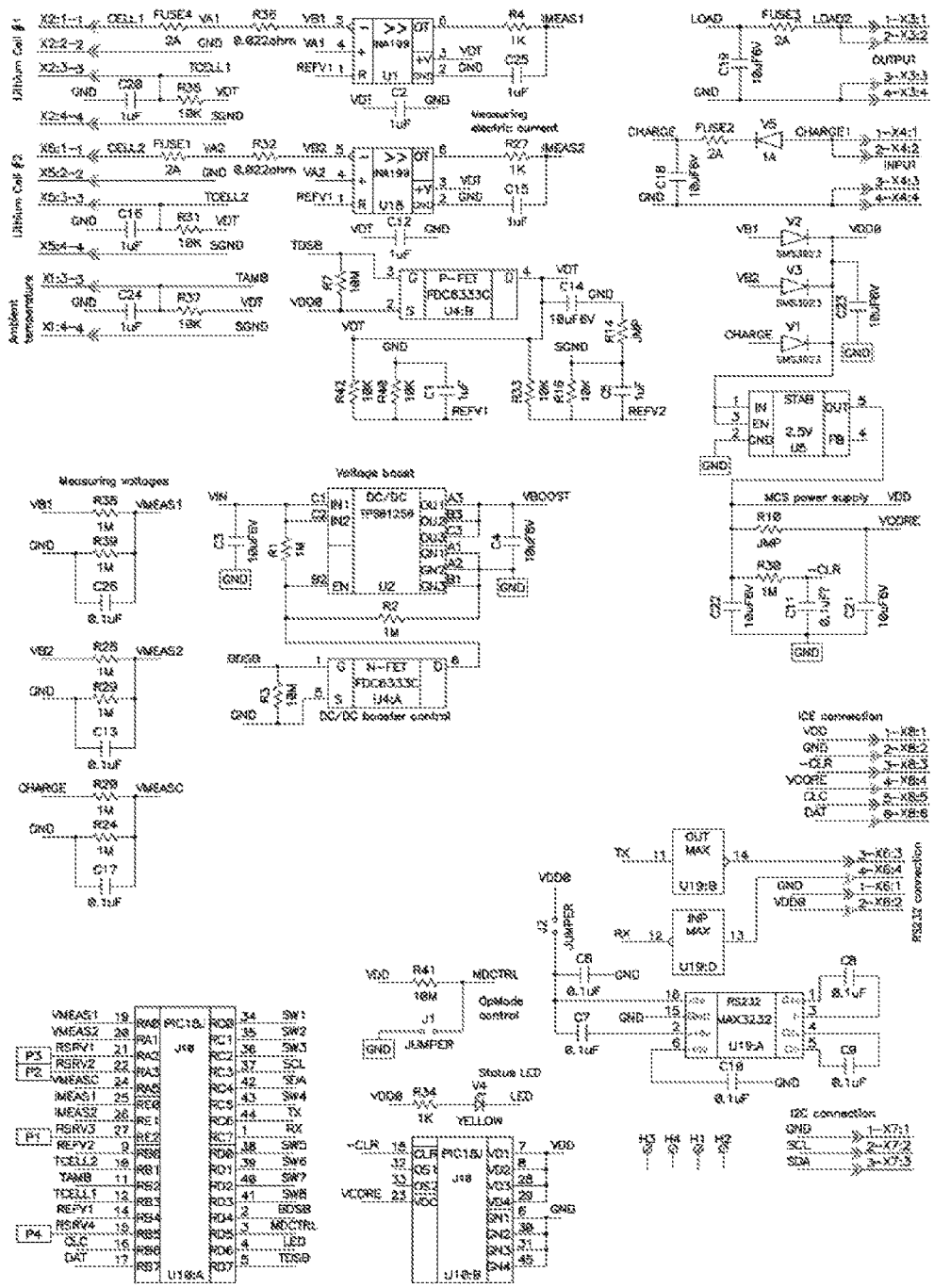
FIGS. 5B-5C show the detailed circuit diagrams for the two-cell battery system of FIG. 5A.
Figure 5C:
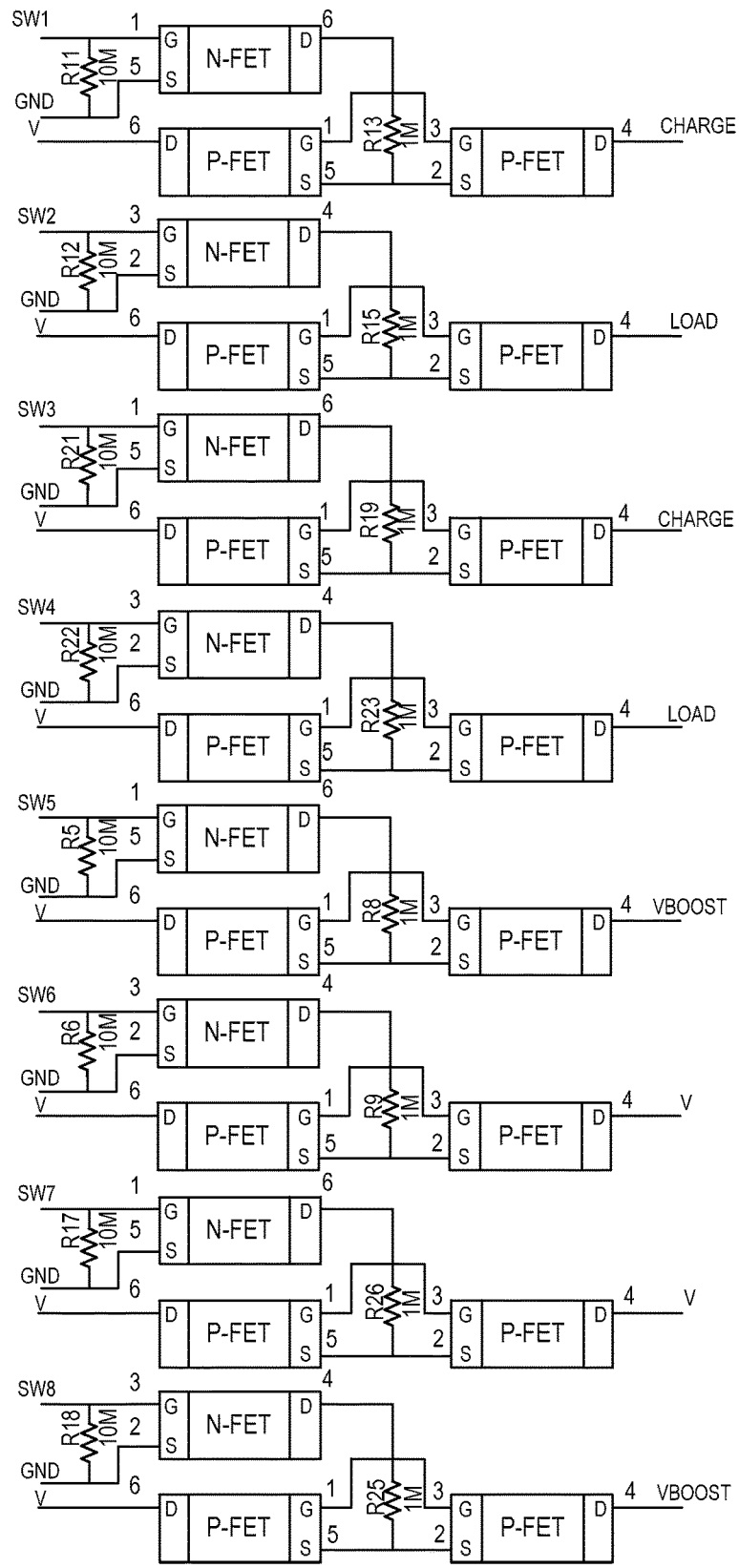

A schematic of an exemplary two-cell battery system is shown in FIGs 5A-C. This exemplary system facilitates pulsed energy exchange between two battery cells VB1, VB2 (intercell exchange) as well as pulsed charging combined with inter-cell exchange and pulse discharging combined with intercell exchange. DC-DC converter boosts voltage level to transfer energy from one cell to another. The DC-DC converter may be a TPS812565 chip set manufactured by Texas Instruments. For delivery of a pulse of energy from cell VB1 to cell VB2, switches 55 and 57 should be turned ON for the duration of the pulse while the other switches are turned OFF, i.e., a state of {0, 0, 0, 0, 1, 0, 1, 0} for switches 51-58. After the duration of the pulse, both 55 and 57 are turned OFF. For delivery of one pulse of energy from cell VB2 to cell VB1, switches 56 and 58 are turned ON for the duration of the pulse, i.e., a state of {0, 0, 0, 0, 0, 1, 0, 1} for switches 51-58, and then turned off after the duration of the pulse. A charge pulse for cell VB1 can be formed by turning switch 51 ON for the duration of the charge pulse while all other switches are OFF, i.e., a state of {1, 0, 0, 0, 0, 0, 0, 0} for switches 51-58. A combined charge pulse for cell VB1 and a discharge pulse for cell VB2 can be formed by turning switches 51 and 54 ON while all other switches are OFF, i.e., a state of {1, 0, 0, 1, 0, 0, 0, 0} for switches 51-58.

Tests show that when a battery cell gets charged and discharged via application of large number of pulse formations similar or close to previously described, it allows the battery cell to be charged to a higher than normal voltage without negative effects (e.g. safety concerns). Additionally, the battery cell works without noticeable negative effects even under elevated temperatures up to +65 C. In a battery system including multiple cells, one cell stayed in idle mode (not receiving or delivering any energy) while another cell received a charge pulse from a charger and yet another still either delivered energy to either a load or another cell. Use of such techniques for charging, idling, and/or discharging have been shown to prevent battery cell capacity from degrading even when charged to higher than nominal voltages. In an exemplary case, a lithium-ion battery that is generally charged to a maximum of 4.2V was charged using the previously described methods to 4.8V and discharged to 2.5V. This increased the energy output (capacity) by 80% over the original manufacturer's rated capacity.

The methods/systems of the present disclosure may also be used to rejuvenate cells with a degraded capacity. In one test scenario, an aged and exposed to multiple charge/discharge cycles Li-ion battery cell was attached to our system. It was then charged and discharged through the application of adjustable sequences of pulses. Charging started from a fully discharged battery state. Pulse sequence adjustment was done according to a recently measured charge state. The pulse discharge was stopped for short periods of time (~3~5 min) and then resumed. In this exemplary case, the battery cell voltage dropped down to ~2.7 V under the load, increased back to ~3.2V immediately after the load was removed, and to ~3.8V 5 minutes after the load was removed. The discharge process with short stops was done until the point in time after load was removed from the battery ("after load voltage"), and the voltage was measured at approximately 3.3V. The battery cell was then pulse charged after this until its idle voltage was around 4.1V. Such cycling was repeated several times after which the after load voltage was between 3.3V and 3.5 V. Such battery cell provided the 80% of rated capacity after such procedure. Initial capacity of the battery cell before recovery procedure was below 40% of rated capacity.

In another exemplary case, adjustment parameters were compiled into a spreadsheet. When the battery reached a voltage level corresponding to one of the voltage levels/ranges noted in the spreadsheet, the battery charging parameters were adjusted accordingly. When the battery reached the maximum voltage level, the maximum current achieved during any of the charge pulses is monitored. If the maximum current goes below a threshold (e.g. 100 mA) the charging process is stopped, and the battery cell can be discharged with pulses.

Figure 6:
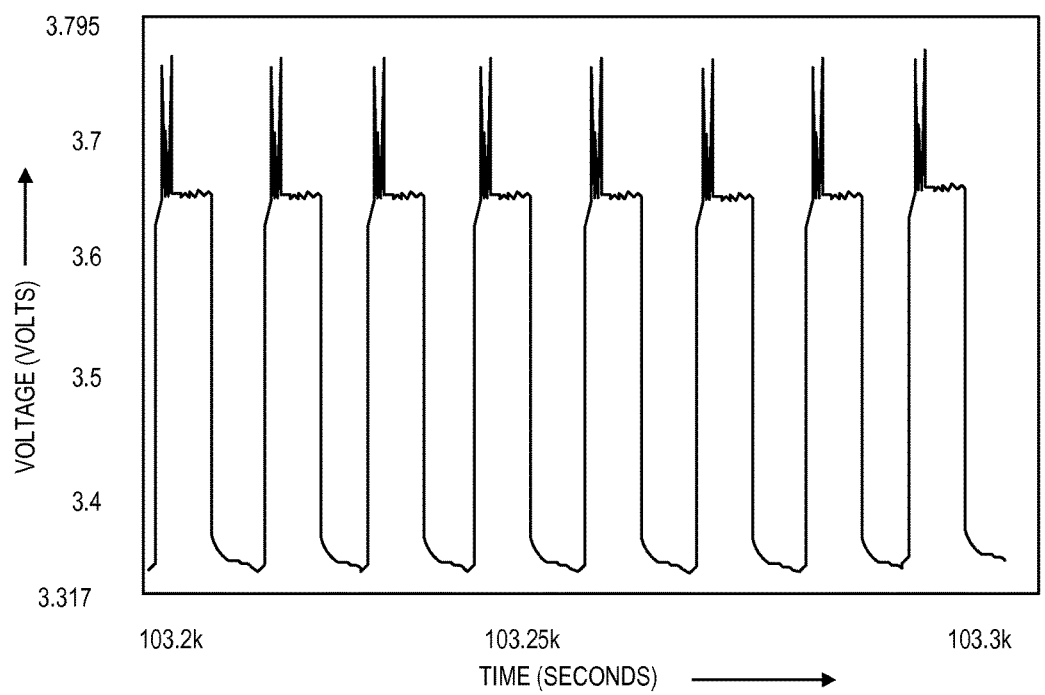
FIG. 6 shows an oscilloscope trace of a discharge pulse sequence for a battery cell, in accordance with embodiments of the present disclosure.

FIG. 6 shows the discharge process of a battery system (could be a single-cell, a single cell with a capacitor, a multi-cell system with at least two cells) in one test scenario. The frequency of discharge pulses was adjusted depending on the state of the battery cell discharge. The cell is discharged for a period of time Td and then it is disconnected from the load and goes through a relaxation period Tc. The two short pulses on top of the waveform of FIG. 6 are energy exchange pulses provided by another cell or capacitor during the relaxation period for the cell under discharge. The discharge/charge parameters and timing values noted above are exemplary and might be changed depending on battery cell type and condition.

Re-Configurable Battery Systems

In battery systems with multiple cells, the multi cell structure could be reconfigured for pulsed energy exchange in different ways, e.g., in a ring, star or complicated switch fabric or other type of structure. Such a re-configurable multi-cell battery system may also be dynamically re-grouped according to the voltage and current requirements requested by a load, or as per the voltage/current capabilities of a charger. A battery system controller associated with the battery system may comprise a processor that determines a configuration schedule, based on communications from the external unit (whether the load or the charger). A configuration schedule comprises a sequence of one or more entries, each entry including a time and a battery system configuration. An exemplary configuration schedule may be [t1, configuration 1], [t2, configuration 2], [t3, configuration 3].

In an exemplary reconfigurable battery system, the battery system consists of 10 Li-ion cells, each of which provides a nominal voltage of 3.7V under the load of 1 A. The cell voltage ranges from 2.5V to 4.0V under this load. This battery system could be configured to provide power to a variable load, which may be exemplarily, a variable-speed electric motor coupled to the battery system via a variable voltage inverter. The variable voltage inverter provides the variable voltage necessary for variable speed control of the motor. As the inverter's efficiency is best when the input to output voltage ratio is at a minimum, it would be beneficial if the battery system provides a variable voltage to the input of the inverter. Such variable voltage output of the battery system is achieved by a dynamic regrouping of the system's battery cells, facilitated by signaling between a load controller (associated with the inverter/motor) and the battery system controller via a communication channel (which may be oneway or 2-way). For example, if the load controller requests that 3.7V, 1 A power is provided to the inverter, the battery system controller may connect, one at a time, each of the cells of the battery system to the load. This connection scheme provides the longest relaxation time for each cell and is the most efficient for the cell's discharge. Each battery cell participating in this mode may be connected to the load for time durations that are chosen based on cell's age, current state of charge and health. When the load controller requests an increase in output current with still the same output voltage, battery cells may still be connected to the load in rotation, but in some cases connected as parallel groups to facilitate the higher current. Decision of how many and which battery cells to be connected in parallel while delivering energy to the load is made by the battery system controller.

If the load controller requests an increase of the voltage delivered to the motor from 3.7V to 7.4V, the battery system controller may re-group battery cells in such a way that the load is connected to at least two battery cells connected in series at any instant in time. Battery cells deliver power to the load in such a series-formation for an assigned duration of time. Such a time assignment may be necessary to accommodate battery cell balancing and to prevent some cells from being discharged earlier than others. In some cases such battery formations are done as combination of serial and parallel connections. For example a group of two weaker battery cells connected in parallel is connected in series with another stronger cell. Other formations may also be contemplated. In some cases longer chains of multiple parallel connected cell groups are formed. Other combinations are also possible. If the maximum voltage of 37V is requested by the load controller, a1 110 battery cells may be connected to the load in series. In case of one or several battery cells reaching their discharge limits, such cells would be eliminated from group formations in some modes. It is beneficial to give some weaker battery cells extended relaxation time periods while still using other cells of the system. After extended relaxation such weaker cells will be still discharged for some additional time. In some cases such weaker cells will be included into power delivery formations only in cases when the individual current for each participating cell and duration of time under such load current are below a calculated threshold.

While the above embodiments described how the battery system may be reconfigured as per communications received from the load controller, the load controller may also reconfigure its load conditions based on communication from the battery system controller. For example, the load controller will choose the motor speed variations based on battery system controller reports about remaining system capacity in each possible power delivery mode. In case of five battery cells having 30% remaining capacity and five other cells having 10% remaining capacity (despite of all efforts to balance the overall battery cell discharge), the load controller may limit motor speed modes to those allowing the appropriate/optimal usage of all energy stored in the battery system. The battery system controller reporting the overall battery cell health state allows the load controller to optimize the motor speed variations and select such speeds which are acceptable by the battery system controller to build battery formations for the load. The user might be given estimated load performance modes and time of use based on the battery system controller reports. In this case user might choose performance over longer drive time, or vice versa, for example.

Usage of such dynamically reconfigurable battery system with a variable load is not limited to the exemplary embodiment only. Another exemplary application of a reconfigurable battery system is in storage of solar and wind energy. Solar and wind energy systems provide variable amount of electricity at any given instant of time, on account of its dependency on the variable weather conditions. The battery system's health and thus, its calendar life can be enhanced if it is able to dynamically reconfigure according to real time requirements of the renewable energy source (and any external load that may eventually draw power from the battery system).

Communication between controllers of the energy source and the battery system would allow the battery system to re-configure in such a way that the battery system will provide the maximum possible storage capacity for the longest calendar life, as well as cycle life. When the energy source controller reports that it can provide a higher voltage, the current output battery system controller configures the battery system accordingly in order to match (e.g. in real-time) the battery cell formation voltage and the charging current capacity with the output level of the energy source. In the case of a simplified, controller-less energy source, the battery system controller may identify the necessary cell configuration based on obtained measurements on the energy source output. This/matching' of the battery system with the energy source output results in better efficiency.

Figure 7:
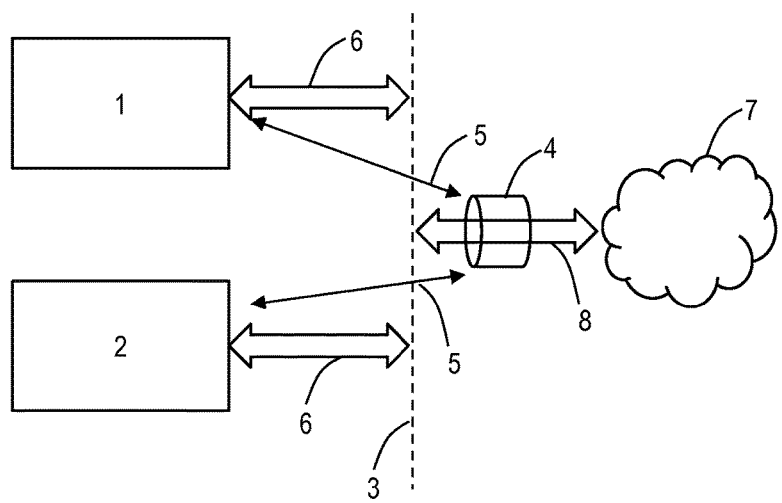
FIG. 7 shows an application of two battery system units in micro-grids, in accordance with embodiments of the present disclosure.

An energy storage system with one or more grid tie inverters is described below. The exemplary system 3 shown in FIG. 7 has two energy storage units 1 and 2 (may be battery system units as described above), which are connected to the micro-grid (for example, via standard household plug connections 6). Each energy storage unit is equipped with a grid tie inverter capable to synchronize its output with the micro-grid 3. The number of such storage units in a micro-grid 3 may be any number. In an exemplary scenario, each storage unit has a capacity of 2 kWhr and is capable to output 1 kW of power. Main power connection 8 is equipped with a wireless current sensor 4. The current sensor 4 is configured to obtain a real-time measurement of the electric current flowing in or out of the micro-grid 3 through the main power connection 8. The current sensor 4 data output is wirelessly coupled through channels 5 to the energy storage units 1 and 2. The current sensor 4 may be powered from the main power connection 8 via inductive coupling. Alternately, the sensor may be powered from its own internal battery or from the micro-grid 3. Both grid tie inverters of storage units 1 and 2 coordinate their output levels to the micro-grid 3 such that there is no flow of electric current from micro grid 3 to the grid 7. When electric current is not flowing from micro grid 3 to the grid 7, the storage units 1 and 2 are supplying energy only to loads internal to the micro-grid 3 and are not delivering energy to grid 7. If the current sensor indicates that the energy flow direction is from micro grid 3 to outside, the grid tie inverters are configured to shut off transfer of energy from the energy storage units 1, 2 to the microgrid 3. Each storage unit may comprise multiple battery cells that utilize the pulsed charging, discharging and energy transfer methods described earlier. In another embodiment, the energy storage units coordinate their output with each other so that each unit has a relaxation time while another unit is supplying energy. In embodiments, the energy storage units are made with conventional battery system architecture. A single battery storage unit may be used for the system instead of the two shown in FIG. 7.

The battery system controller of a reconfigurable battery system may coordinate pulsed energy exchange between battery cells during the energy delivery. For example, after a battery cell is disconnected from the load it could be provided with a short charging pulse from another battery cell or group of battery cells, as assigned by the controller. Such intermittent pulsed energy exchanges could utilize techniques as described in the earlier sections of this present disclosure.

Exemplary Embodiment

In an exemplary embodiment, the battery system comprises a plurality (N) of cells, of which M (where M is an integer greater than or equal to 1) cells are considered as helper cells while the remaining N-M cells are considered as worker cells. The M helper cells may operate in unison or may be operated separately.

The battery system may operate in any one of a plurality of operating modes, and the helper cells support the operation of the worker cells during one or more operating modes of the battery system. In embodiments, the battery system has four operating modes—CHARGE, DISCHARGE, CHARGE-DISCHARGE and IDLE modes. In the CHARGE operating mode, the battery system receives energy from external source. In the DISCHARGE operating mode, the battery system provides energy to an external load. In the CHARGE-DISCHARGE operating mode, the battery system simultaneously receives energy from the external source and provides energy to an external load. The IDLE operating mode occurs when the battery system is not in any of the other three operating modes.

In embodiments, the helper cells support the worker cells during the DISCHARGE, CHARGEDISCHARGE and IDLE operating modes, while in the CHARGE operating mode, the helper cells operate in the same fashion as the worker cells of the battery system. The operation of the helper cells and the worker cells in the various operating modes is described in greater detail below.

Idle Operating Mode

For improved performance, the battery system of the present disclosure, in the IDLE operating mode, minimizes its own power consumption and provides life-extension treatment for the cells included in the battery system. The battery system utilizes two different algorithms-SHAKE algorithm and the ALIGN algorithm, to obtain life-extension.

During the SHAKE algorithm, all cells of the battery system periodically pass through two phases, a SHAKE-DISCHARGE phase when the energy from a group of the cells is transferred into a temporary storage element and a SHAKE-CHARGE phase when the energy stored within the temporary storage element is transferred into a group of the cells. The groups of cells involved in the SHAKECHARGE and SHAKE-DISCHARGE phases may be the same or may be different. During the SHAKE algorithm, the helper cells are treated the same way as the worker cells of the battery system. The temporary storage element may be a capacitor, which may be within or external to the battery system. The temporary storage element may also be another group of cells of the battery system.

During the ALIGN algorithm, each of the worker cells periodically pass through an ALIGNDISCHARGE phase when the energy from one or more of the helper cells is transferred into the worker cell. At any given time, the worker cell included in the ALIGN-DISCHARGE phase is selected based on one of the following four approaches:
Random selection from the N-M worker cells
Sequential selection of each of the N-M worker cells
Random selection from a subset of L cells of the N-M worker cells, where L is less than or equal to N-M. The subset of L cells may either be those worker cells with output voltage level below or equal to a threshold voltage TH1, or may be those worker cells with remaining capacity level below or equal to a threshold TH2.
Sequential selection of each of a subset of L cells of the N-M worker cells, where L is less than or equal to N-M. The subset of L cells may either be those worker cells with output voltage level below or equal to a threshold voltage TH1, or may be those worker cells with remaining capacity level below or equal to a threshold TH2.

The selected cell may remain in the ALIGN-DISCHARGE phase (or in connection with the one or more helper cells), for either a predetermined time period T1, a configurable time period T2 or a randomly selected time period T3. The value of T3 is set to a finite value.

Discharge Operating Mode

In the DISCHARGE operating mode, the battery system attempts to keep all the N-M worker cells at the same output voltage level or at the same capacity level. This enhances the life of the battery cells and promotes efficient utilization of the energy source during a charging cycle that may follow.

During the DISCHARGE operating mode, the battery system may also recognize partial failure of any of the N-M worker cells. This is important for overall performance as a partially failed cell may significantly impact the capacity of the battery system and therefore, the time that the battery system is able to provide the required amount of the energy to an external load.

To mitigate the negative impact of partially failed cell(s), the helper cells utilize a HELPER algorithm to support the worker cells. The HELPER algorithm includes the following steps:
a) Select a target cell TCk to support, from the N-M worker cells
b) Connect the selected target cell TCk for a time period TS to one or more helper cells
c) After the expiration of time period TS, select next target cell TCk+1 to support from the N-M worker cells
d) Disconnect the selected target cell Tck from the helper cell(s)
e) Repeat from step (b)

The target cell to support, in the HELPER algorithm, is selected based on the following criteria:
Out of the N-M worker cells, a subset of J cells (J is less than or equal to N-M) with either output voltage level below or equal the voltage level of the helper cells (in unison) or a current capacity level below or equal the current capacity level of the helper cells (in unison) is identified.
If the output voltages of all members of the subset of identified cells are between TH3 and TH4 (i.e., $TH3 \leq V1, \ldots, VN-M \leq TH4$), the target cell is randomly selected from the subset of identified cells.
If the output voltage of some of the identified cells is less than TH3, the cell with the smallest voltage is selected as the target cell.
If more than one cell have output voltage below TH3, and all of them have equal voltage, the first cell from the list of all cells with output voltage less than TH3 is selected.
If the current capacity level of all members of the subset of identified cells are between THS and TH6 (i.e., $THS \leq C11 \ldots, CN-M \leq TH6$), the target cell is randomly selected from the subset of identified cells.
If the current capacity level of some of the identified cells is less than THS, the cell with the smallest current capacity level is selected as the target cell.
If more than one cell have current capacity level below THS, and all of them have equal current capacity levels, the first cell from the list of all cells with current capacity level less than THS is selected.

Charge-Discharge Operating Mode

In the CHARGE-DISCHARGE operating mode, the helper cells operate in the same manner as in the DISCHARGE operating mode. Some of the cells that are providing energy can be included in the HELPEE set. In some cases, the HELPEE set could be subdivided into plurality of groups and each group could be assigned to be included to either a HELPER ASSISTED HELPEE subset or to a CHARGER ASSISTED HELPEE subset. The latter subset of cells will use energy supplied from the charger while the former subset of cells will use energy from the helper cell as described above. A subset of cells may also use a combined assistance mode, which would use energy from both helper cells and a charger. Combined assistance mode in some cases includes use of plurality of chargers, some of which are powered by different energy sources. For example, use of a conventional charger could be combined with use of alternative energy sources such as solar, wind, motion, vibration, heat, tension and other. In this case, the battery system operation in CHARGE-DISCHARGE mode would involve the following roles:

One or more cells assigned to a worker role will supply power to a load will discharge;

One or more cells assigned to a helper role will provide support to worker cells;

One or more cells assigned to be charged will receive power from one or a plurality of chargers; and One or more chargers will provide energy to cells in charge state and to cells requiring help during delivery of energy.

Figure 8:
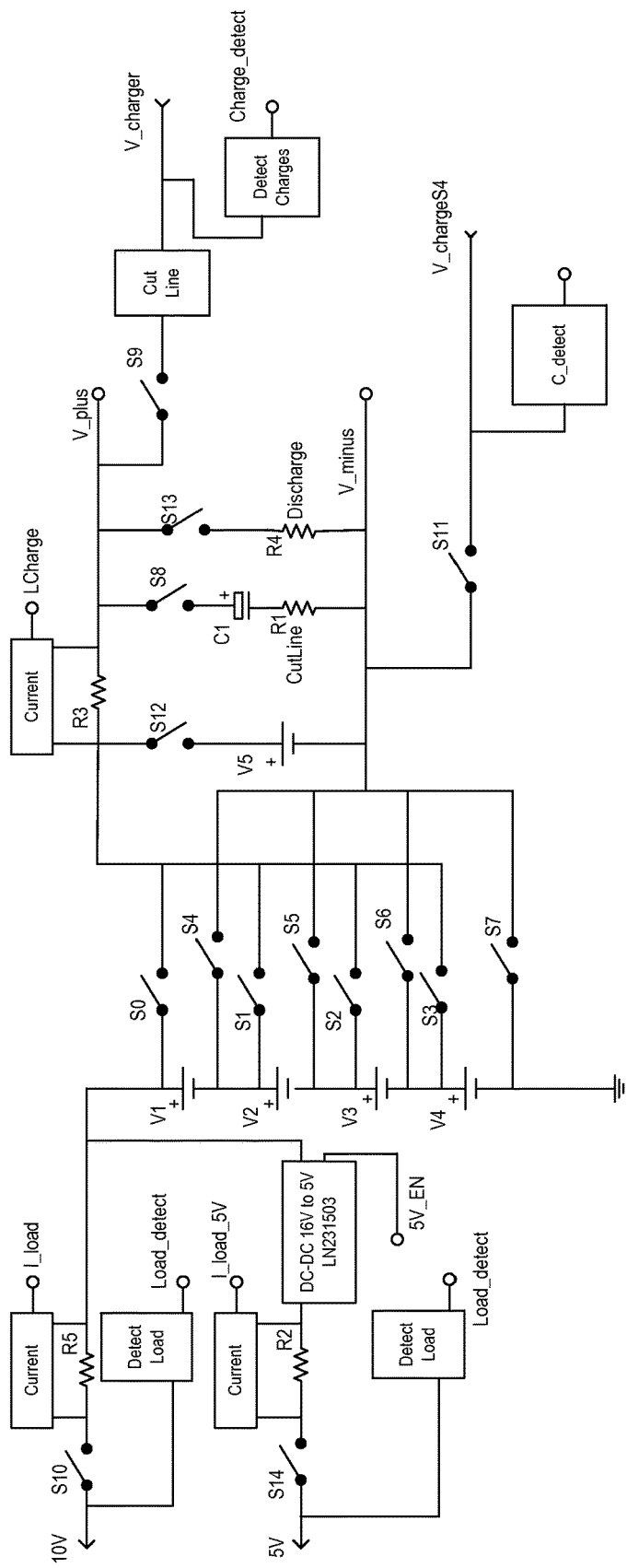
FIG. 8 shows the schematic of a battery system comprising four worker cells and one helper cell, in accordance with embodiments of the present disclosure.

FIG. 8 shows an exemplary 5-cell battery system. V1, V2, V3, and V4 are worker cells and V5 is the helper cell. In one operating mode, charger gets connected to the V_ChargeP and V_ChargeM contacts. In other operating modes, the load may get connected to these contacts. The voltage provided between these two contacts can be reconfigured by controlling the switches S0-S14. There are two types of loads: main load gets connected to 16V output and USB load gets connected to % V output. Capacitor C1 is used as temporary energy storage during SHAKE phase. The various switches S0-S14 can be turned ON/OFF to obtain the different configurations needed to implement the SHAKE, ALIGN and HELPER algorithms noted above, and/or reconfigure the voltage delivered between the two contacts noted above by modifying the number of cells connected in series.

In a fully reconfigurable battery system, the role of a helper and worker cell could be assigned to any cell in the system. Assigning of the/helper' role to a cell could be related to the cell's condition, expected lifetime, environment conditions, chemistry type, load requirements, and other factors.

Vibration Transducers

A vibration transducer may be used with the battery system to enhance ion mobility and diffusivity in the electrolyte, electrode interfaces and the electrodes of the battery system. This approach may be particularly beneficial for battery systems that utilize polymeric electrolytes such as gelled polymers and solvent free polymers. In embodiments, the methods/systems described above may be used along with vibrations to further enhance the performance and utilization of the battery system. Alternately, vibrations may be applied to a conventional battery system without the use of the methods and systems described in the above section.

The vibration transducer may be used in a continuous wave operating mode or in a pulsed operating mode. In continuous wave operation, the frequency and/or phase of the continuous wave vibrations may be determined based on parameters and properties of the battery system. Parameters and properties of the battery system may include any one of the following: current battery cell mode, state of charge and health, and material. Environmental parameters may also be accounted for in the determination of the parameters of the vibration pulses/waves. For example, the vibration transducer may be activated and operated in different modes based on the current load and environment characteristics of the battery system, e.g., if the load is increased, the vibration amplitude is changed accordingly.

The vibrations may also be applied as vibration pulses. The parameters of the vibration pulses may be adjusted based on parameters and properties of the battery system. In embodiments, pulse sequences are used for charging/discharging/energy exchange between the cells of the battery system, and the frequency and/or the phase of the continuous wave vibrations or the vibration pulses may be adjusted in coordination with the charging pulse sequences.

The vibration transducer may be attached to the external surface of one or more battery cells or embedded into one or more of the battery cells of the battery system. Multiple vibration transducers may also be located in different areas of the cell. Such distributed transducer positioning serves to phase shift the vibration waves and thus, achieve the most uniform distribution or motion of ions within the battery cell. The vibration transducer may utilize ultrasonic technology.

The use of the methods and systems noted above for charging/discharging/energy exchange between constituent battery cells of the battery system, as well as the use of vibration transducers can have multiple useful effects.

Firstly, it aids to relax and dissolve polarization areas created inside of a battery cell during the previous charge or discharge cycle, and can also prevent polarization from even occurring. Polarization areas within a battery cell may have different sizes, shapes and locations. As such, different energy levels may be needed to eliminate them or to move charged particles out of such areas. Randomness in the energy transfer, whether triggered by randomness in magnitude, timing or periodicity of the pulse sequences helps to more efficiently neutralize/dissolve different polarization areas or pockets inside of the battery cell.

Secondly, it allows electrodes within the battery to incrementally adjust to volumetric changes caused by ion insertion or removal (intercalation and de-intercalation). Volumetric changes to the electrodes occur in smaller steps when methods/systems of the present disclosure are utilized. Incremental ion movement accompanied by ion reversal movements allow for better uniformity in ion transportation and ion insertion/extraction. The bidirectional movement of ions also enhances the elasticity of the volumetric change occurring in the electrodes. As the volumetric changes occur in a more elastic fashion, mechanical stress on the electrode is greatly reduced or even prevented. Randomly selected shaking pulses also results in charged particle movement occurring at different speeds at different moments of time, which serves to spread electrode volumetric change more evenly over time and thus greatly reduce/prevent electrode deformation, stress, cracking, or collapse during battery cell charging or discharging.

Thirdly, bidirectional motion of charged particles entering and leaving electrodes can also prevent, or at least greatly reduce, SEI layer growth. SEI layer can grow due to byproducts of chemical reactions being dragged onto the existing layer. Periodic application of pulse sequences prevents byproducts from being deposited onto the SEI layer, from being bonded permanently to the SEI layer body or allows the byproducts to be shaken away periodically. The pulse sequence may also prevent/greatly reduce electrolyte degradation and over-lithiation inside of a lithium-ion battery. These bidirectional ion movements prevent/greatly reduce strains or large static deformations from occurring to the SEI layer, which may otherwise lead to its damage or even rupture.

Fourthly, it also helps avoid thermal runaway and provide higher immunity against elevated ambient temperatures. It is possible that this makes the battery systems much safer, and in large battery systems, replaces the need of expensive and complicated liquid cooling systems for an air cooled, or less expensive and sophisticated cooling.

The advantages of the methods of the present disclosure can be noted in the following exemplary test scenarios. In all of these scenarios, a similar approach to what is shown in FIGS. 4A-C were adopted with the specific parameters chosen based on at least the specifications of the battery system.

Figure 9:
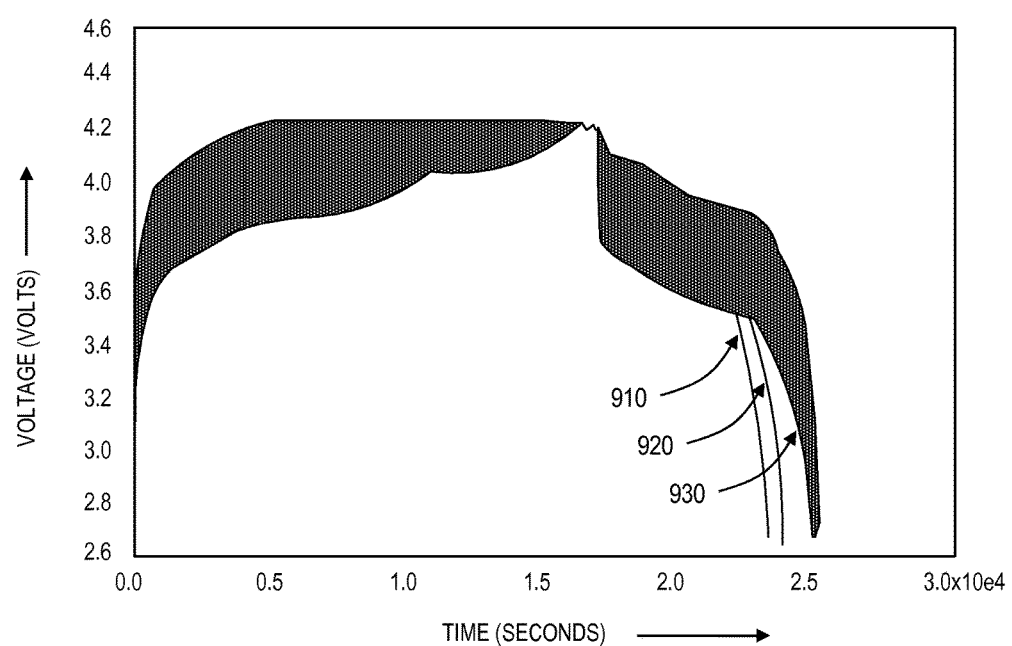
FIG. 9 shows capacity measurements for battery systems utilizing different modes of charging and discharging.

Test Scenario 1—Battery Capacity Measurement:

Three identical units of a battery system with two cells each (each cell being a Li-ion cell with ratings of 3.7V and 1230 mAh) was used for testing. All battery cells were initially tested under the same load conditions and same temperature to validate that they deliver identical capacity. For each of three modes (the modes are explained below), a battery system was cycled through three charge-discharge cycles. For each mode, the fourth charge-discharge cycle measurements for the battery system were captured for one of the two battery cells, and are shown in FIG. 9. The curve 910 shows the mode where the battery was charged using a 0.6 A constant current until 4.18V. The battery was maintained at the voltage level of 4.18V until the current dropped to 0.1 A, and was then discharged at a constant current of 0.6 A. The total capacity calculated from the discharge was 3.8 Wh. The curve 920 shows a mode where the battery was charged using the methods of the present disclosure (similar approach to FIG. 4B) with charge current pulses not more than 1.2 A until the open circuit voltage reached 4.18V. The battery was then discharged at a constant current of 0.6 A. The total capacity calculated from the discharge was 4.2 Wh. The curve 930 shows a mode where the battery was charged by the methods of the present disclosure (similar approach to FIG. 4B) with charge current pulses not more than 1.2 A until the open circuit voltage reached 4.18V. Then battery was then discharged using the methods of the present disclosure (similar approach to FIG. 4C) using 1.2 A current pulses. The total capacity calculated from the discharge was 4.7 Wh, showing a significant improvement over the capacity of 3.8 Wh for the curve 910.

Figure 10B:
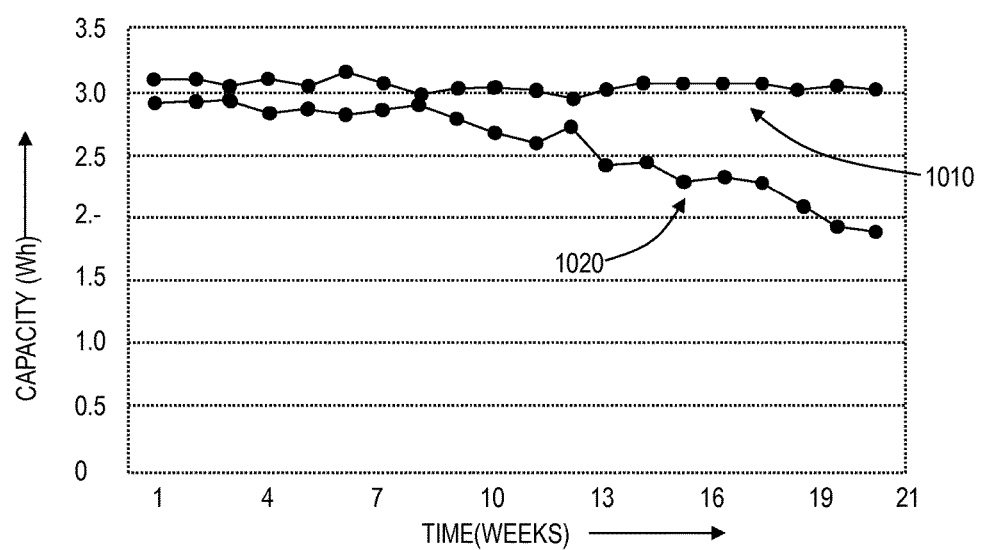

Test Scenario 2—Battery Calendar Life {Capacity Fading) Measurement with Accelerated Aging:

Two identical Li-ion battery cells with rating of 3.7V, 860 mAh (3.18 Wh) were used for the test. The test utilized an Agilent N6700B Low-Profile Modular Power System Mainframe, which was controlled using the Agilent Vee graphical language environment. The first cell (cell #1) was connected to channel #1 of the testing system which performed constant current, constant voltage weekly charging and discharging. The constant current was kept at 430 mA for both charging and discharging, consistent with the specifications in the data sheet for the battery cells. Initially, the cell was fully charged; afterwards, it was kept idle except for weekly measurement cycles. The second cell (cell #2) was connected to channel #2 of the testing system which performed charging and idling according to the methods of the present disclosure (similar approach to FIG. 4B). Once a week, the second cell was discharged according to the methods of the present disclosure (similar approach to FIG. 4C) to measure its capacity, and then charged back to its full charge state. Charging current of not more than 860 mA was used, while the discharging current was maintained at 860 mA. Both battery cells were kept in a temperature chamber under +65 C. (149 F.) for the duration of the test except during the measurement of the battery capacity. For the measurement of the battery capacity, the cells were moved to a room temperature environment of +22 C. (71.6 F.). Capacity measurement was done after both cells cooled for ~30 minutes. After the measurement, both cells were placed back into the temperature chamber for another week, and the process was repeated. The results of these measurements are shown in FIGS. 10A-B.

Figures 11A, 11B:
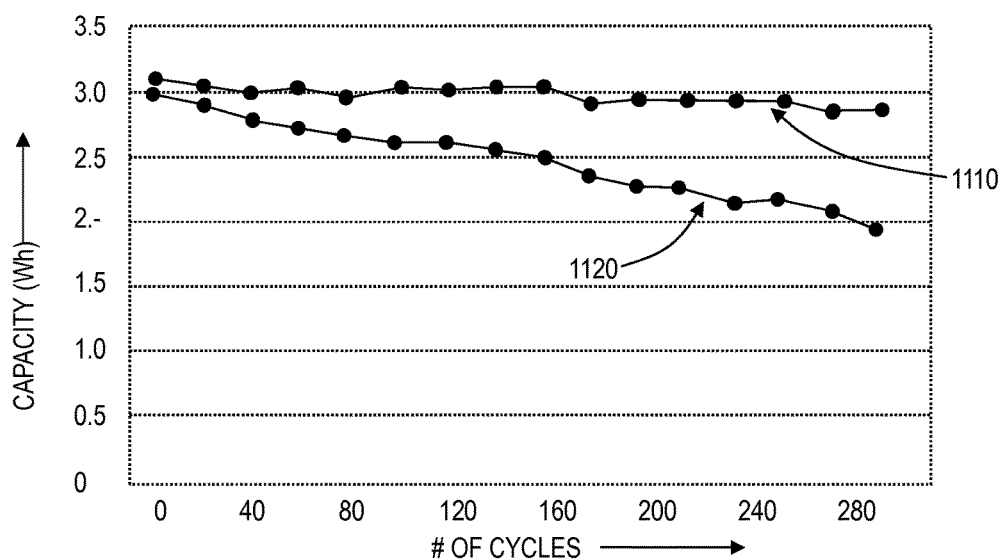
FIGS. 11A-11B show cycle life measurements for battery systems utilizing conventional techniques and methods of the present disclosure.

Test Scenario 3—Battery Cycle Life Measurement:

Two other battery cells (cell #3, cell #4) with rating of 3.7V, 860 mAh were used for the test. Cell #3 was connected to channel #1 of the testing system which performed constant current, constant voltage charging and discharging. The constant current was kept at 430 mA for both charging and discharging, consistent with the specifications in the data sheet for the battery cells. Cell #4 was connected to channel #2 of the testing system which performed charging and idling according to the methods of the present disclosure (similar approach to FIGS. 4B-C). Pulse style currents were used for both charging and discharging. Charging current of not more than 860 mA was used, while the discharging current was maintained at 860 mA. The total elapsed time for the test reached 1860 hours. The results of the measurements are shown in FIGS. 11A-B.

Figure 12:
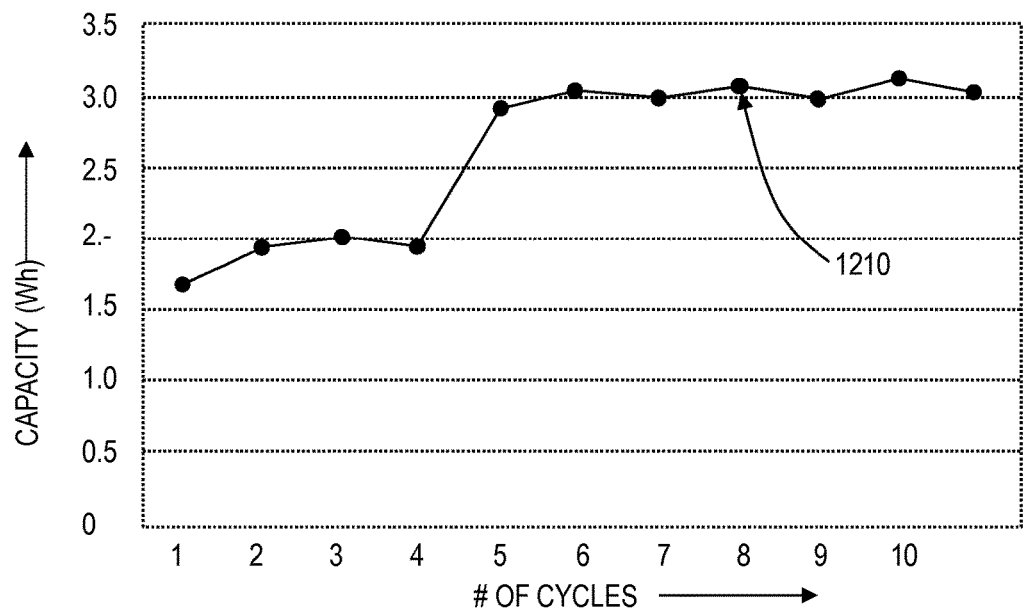
FIG. 12 shows results for rejuvenation of battery capacity using methods of the present disclosure.

Test Scenario 4—Battery Capacity Regeneration:

A 3.7V, 860 mAh (3.18 Wh) Li-ion battery cell with a known age of 4 years was passed through multiple charge and discharge cycles using the methods of the present disclosure (similar approach to FIGS. 4B-C), and its capacity measured after each cycle. The results of the measurement are shown in FIG. 12.

The methods and systems of the present disclosure can be applied to a variety of battery materials and structures, not limited to battery systems that have an anode, cathode, or separator with porous, crystalline, webbed, nanowire, nanotube, or similar structured materials. The methods/systems of this present disclosure could work with lithium-ion, lithium-polymer, and other types of battery cells, as well as ultra-capacitors.

Silicon (Si) has emerged as a promising electrode material for next-generation battery cells/systems, as it theoretically provides a low anode voltage and a high specific capacity of 4,200 mAh/g. However, Si expands volumetrically by up to 400% upon lithiation (full lithium insertion), and can contract significantly upon delithiation (lithium extraction). Such volumetric changes may degrade the mechanical integrity of the Si electrodes and the stability of the SEI layer; both of these effects pose serious challenges to the use of Si-based anode materials in next generation battery systems. The stress induced by the large volumetric changes causes cracking and pulverization of the Si anodes, which results in reduction of electrical contact and capacity fading. This is considered to be the main reason for the rapid capacity loss in early studies of Si anodes. Nanostructured materials such as nanowires, nanotubes, double wall nanotubes, nanoporous films and Si/carbon composites, can help to address the materials stability issue as mechanical strains may be relaxed due to the small size of nanostructures and free space available in such structures. In addition, the incremental ion movement and ion reversal movements provided by the methods/systems of this application can provide improved strain relaxation during both lithiation and delithiation processes.

Figure 13:
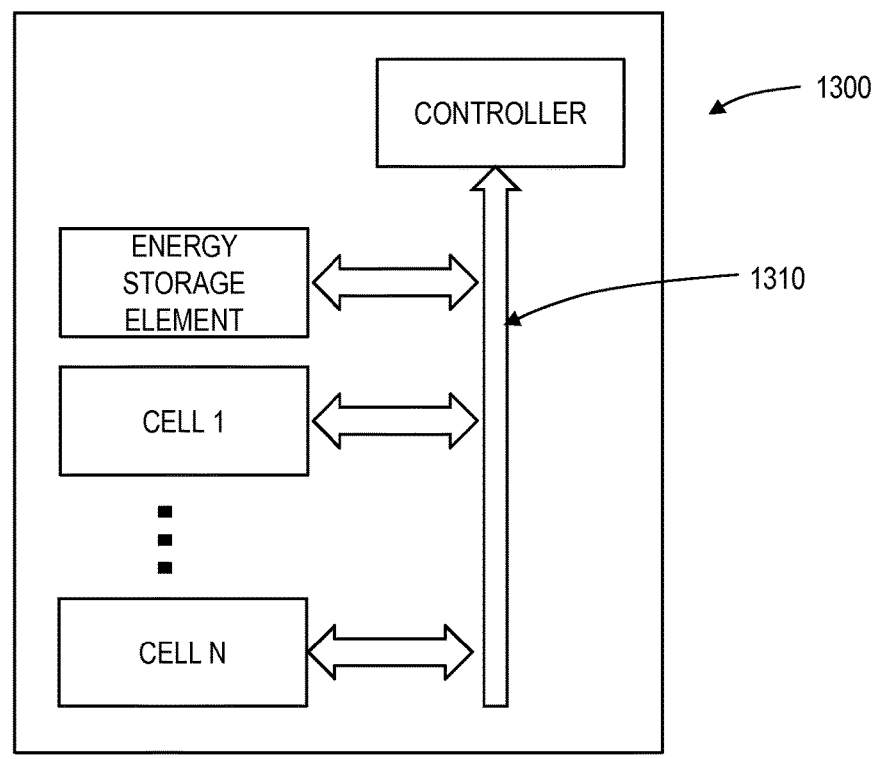
FIG. 13 shows the exemplary schematic of a battery system according to embodiments of the present disclosure.

FIG. 13 shows an exemplary schematic of a battery system 1300 according to embodiments of the present disclosure. Multiple cells (Cell1 to Cell N) are operatively associated with the battery system controller via a communication path (e.g. a bus) 1310. Energy exchanges between the cells and the energy storage element (for example, a capacitor) are done as per methods described above.

It will be appreciated that some exemplary embodiments described herein may include one or more generic or specialized processors such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. For example, the battery system controller may be implemented using such one or more processors. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of energy exchange in a battery having a plurality of battery cells, the method comprising:
exchanging a sequence of pulses between two or more battery cells of the plurality of battery cells, wherein:
the sequence of pulses includes at least one supercluster of pulses,
the at least one supercluster of pulses includes a plurality of clusters of pulses,
each of the plurality of clusters of pulses includes a plurality of pulses that have opposite polarities, and
a relaxation period after each cluster of the plurality of clusters of pulses is longer than a relaxation period between adjacent pulses within the corresponding cluster.

2. The method of claim 1, wherein the plurality of pulses that have opposite polarities include a plurality of positive pulses and a plurality of negative pulses, and wherein the plurality of positive pulses have at least one of pulse duration, start time, and amplitude different from the plurality of negative pulses.

3. The method of claim 1, further comprising selecting one or more pulse parameters, for the pluralities of pulses, randomly from corresponding particular sets of fixed values,
wherein the pulse parameters include pulse shape, pulse duration, and pulse polarity.

4. The method of claim 1, further comprising:
selecting one or more of: a number of pulses included in each of the plurality of clusters of pulses, a duration of each of the plurality of clusters of pulses, and a relaxation period between adjacent pulses within each of the plurality of cluster of pulses randomly from a particular range of values.

5. The method of claim 1, further comprising:
determining one or more of state of charge and health of at least one of the two or more battery cells; and
determining, based on the determination of the one or more of the state of charge and the health, whether to keep the sequence of pulses symmetrical or asymmetrical.

6. The method of claim 1, further comprising dynamically adjusting one or more cluster parameters of at least one the plurality of clusters of pulses based on one or more battery cell parameters of one of the two or more battery cells,
wherein the cluster parameters include: a number of pulses, pulse duration, relaxation periods between pulses, pulse amplitude, and a relaxation period, for the at least one of the plurality of clusters of pulses, and
wherein the battery cell parameters include state of charge, health, chemistry type, cathode type, anode type, and separator type.

7. The method of claim 1, further comprising adjusting one or more pulse parameters based on one or more of: age of the battery, a number of charge/discharge cycles, temperature of the battery, load associated with the battery, a type of a charger that charges the battery, state of the charger, and available power to the charger,
wherein the pulse parameters include pulse shape, pulse duration, and pulse polarity.

8. The method of claim 1, wherein the plurality of clusters included in the at least one super cluster are similar to each other.

9. The method of claim 1, wherein the plurality of clusters included in the at least one super cluster are different from each other.

10. The method of claim 1, further comprising:
determining periodicity of a particular cluster in the at least one super cluster based on one or more of: age of the battery, a number of charge/discharge cycles, temperature of the battery, load associated with the battery, a type of charger that charges the battery, state of the charger, and available power to the charger.

11. A battery system, comprising:
a battery having a plurality of battery cells; and
a controller, operatively coupled to the battery, and configured to:
exchange a sequence of pulses between two or more battery cells of the plurality of battery cells, wherein:
the sequence of pulses includes at least one supercluster of pulses,
the at least one supercluster of pulses includes a plurality of clusters of pulses,
each of the plurality of clusters of pulses includes a plurality of pulses that have opposite polarities, and a relaxation period after each cluster of the plurality of clusters of pulses is longer than a relaxation period between adjacent pulses within the corresponding cluster.

12. The battery system of claim 11, wherein the controller is further configured to adjust one or more parameters of the sequence of pulses in either a pre-determined sequence or in a sequence determined dynamically.

13. The method of claim 12, wherein the parameters of the sequence of pulses include pulse duration, a number of pulses in clusters, a number of clusters in a supercluster, the relaxation period between the adjacent pulses, pulse duration, pulse amplitude, and pulse shape.

14. The battery system of claim 11, further comprising:
one or more sensors to measure one or more parameters of the battery system in real-time,
wherein the controller is further configured to adjust one or more parameters of the sequence of pulses based on the measured one or more parameters.

15. The battery system of claim 11, further comprising:
a DC-DC converter configured to adjust voltage level of pulses exchanged between the plurality of battery cells.

16. The battery system of claim 11, further comprising:
a plurality of switches configured to enable exchange of sequence of pulses between the plurality of battery cells.

17. The battery system of claim 11, wherein the controller is further configured to modify the sequence of pulses based on a response of the battery to previously applied pulses.

18. The battery system of claim 11, wherein the controller is further configured to select one or more pulse parameters randomly from a particular range of values, and
wherein the particular range of values is determined based on at least one of: physical parameters of the battery system, parameters of the load, and parameters of a charging system that charges the battery.

19. A method of energy exchange in a battery, the method comprising:
discharging, during a discharge cycle, a battery cell of the battery, via a load connected to the battery, for a first period of time;
subsequent to elapse of the first period of time, disconnecting, during the discharge cycle, the battery cell from the load for a second period of time; and
providing, during the discharge cycle, a sequence of pulses, which includes at least two short pulses, to the battery cell during the second period of time, wherein:
providing the sequence of pulses includes obtaining the at least two short pulses from another battery cell of the battery or an energy storage element associated with the battery, and
the first period of time and the second period of time are based on at least one of: a type of the battery cell, age of the battery cell, temperature of the battery cell, and health of the battery cell.

20. The method of claim 19, wherein discharging the battery cell includes discharging the battery cell through discharge pulses, and wherein a frequency of the discharge pulses is based on a state of the battery cell.

* * * * *